(12) United States Patent
Yamasaki et al.

(10) Patent No.: US 12,395,036 B2
(45) Date of Patent: Aug. 19, 2025

(54) MOTOR AND BLOWER INCLUDING THE SAME

(71) Applicant: Nidec Corporation, Kyoto (JP)

(72) Inventors: Yuta Yamasaki, Kyoto (JP); Hideaki Aoi, Kyoto (JP); Nobuaki Yasumoto, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 17 days.

(21) Appl. No.: 18/128,265

(22) Filed: Mar. 30, 2023

(65) Prior Publication Data

US 2023/0318392 A1    Oct. 5, 2023

(30) Foreign Application Priority Data

Mar. 31, 2022 (JP) .................. 2022-060678
Mar. 31, 2022 (JP) .................. 2022-060679
Mar. 31, 2022 (JP) .................. 2022-060680
Mar. 31, 2022 (JP) .................. 2022-060681

(51) Int. Cl.
  *H02K 5/10*    (2006.01)
  *F04D 25/06*   (2006.01)
  *H02K 3/50*    (2006.01)
  *H02K 11/33*   (2016.01)
  *H02K 21/22*   (2006.01)

(52) U.S. Cl.
  CPC .............. *H02K 5/10* (2013.01); *F04D 25/06* (2013.01); *F04D 25/0693* (2013.01); *H02K 3/50* (2013.01); *H02K 11/33* (2016.01); *H02K 21/22* (2013.01); *H02K 2203/06* (2013.01); *H02K 2211/03* (2013.01)

(58) Field of Classification Search
  CPC . H02K 5/10; H02K 3/50; H02K 11/33; H02K 21/22; H02K 2203/06; H02K 2211/03; F04D 25/06; F04D 25/0613; F04D 25/0646; F04D 25/0693; F04D 29/083; F04D 29/522
  See application file for complete search history.

(56) References Cited

U.S. PATENT DOCUMENTS

| | | | | |
|---|---|---|---|---|
| 6,291,914 B1 * | 9/2001 | Mukaiyama | ............ | B62D 6/10 310/68 B |
| 11,165,305 B2 * | 11/2021 | Lee | ........... | H02K 5/10 |
| 11,715,987 B2 * | 8/2023 | Ishikawa | .................. | H02K 9/19 310/88 |

(Continued)

*Primary Examiner* — Dominick L Plakkoottam
(74) *Attorney, Agent, or Firm* — Keating & Bennett, LLP

(57) ABSTRACT

A motor includes a rotor, a stator, a stator accommodating portion, a seal, and a lid. The stator opposes the rotor with a gap interposed radially inward. The stator accommodating portion accommodates the stator, includes an opening on one end surface in an axial direction, and has a tubular shape. The seal is filled in the stator accommodating portion. The lid covers the opening. The stator accommodating portion includes a cutout and a pullout piece. The cutout is recessed from one end in the axial direction to the other side in the axial direction, and a lead wire connected to the stator is pulled out. The pullout piece protrudes radially outward from a bottom of the cutout, and the lead wire is positioned between the lid and the pullout piece via an elastic portion on an end surface on one side in the axial direction of the pullout piece.

9 Claims, 10 Drawing Sheets

(56) References Cited

U.S. PATENT DOCUMENTS

| | | | |
|---|---|---|---|
| 2012/0269665 A1* | 10/2012 | Takeshita | F04D 19/002 417/420 |
| 2016/0380502 A1* | 12/2016 | Koiwai | H02K 3/44 310/71 |
| 2018/0252223 A1* | 9/2018 | Yamasaki | H02K 5/16 |
| 2018/0337567 A1* | 11/2018 | Yamasaki | H02K 5/10 |
| 2019/0013113 A1* | 1/2019 | Nakashima | H01B 7/00 |
| 2019/0305651 A1* | 10/2019 | Mao | H02K 21/14 |
| 2019/0334405 A1* | 10/2019 | Yamasaki | H02K 15/12 |
| 2021/0095679 A1* | 4/2021 | Uchino | F04D 25/08 |

* cited by examiner

MOTOR AND BLOWER INCLUDING THE SAME

CROSS-REFERENCE TO RELATED APPLICATIONS

The present application claims priority under 35 U.S.C. § 119 to Japanese Patent Application No. 2022-060678, Japanese Patent Application No. 2022-060679, Japanese Patent Application No. 2022-060680, and Japanese Patent Application No. 2022-060681 filed on Mar. 31, 2022, the entire contents of each application are hereby incorporated herein by reference.

1. FIELD OF THE INVENTION

The present disclosure relates to a motor and a blower including a motor.

2. BACKGROUND

A conventional motor includes a rotor, a stator, a stator accommodating portion (stator housing portion), and a sealing member (insulator). The rotor rotates about a rotation axis. The stator opposes the rotor with a gap interposed radially inward. The stator accommodating portion accommodates the stator. The sealing member is filled in the stator accommodating portion. A lead wire electrically connected to the stator is pulled out to an outside of the stator accommodating portion.

A conventional motor includes a rotor, a stator, a circuit board, a stator accommodating portion (stator housing portion), and a sealing member (insulator). The rotor rotates about a rotation axis. The stator opposes the rotor with a gap interposed radially inward. The circuit board is connected to the stator and disposed on one side in an axial direction of the stator. The stator accommodating portion accommodates the stator and the circuit board, and has an opening on one end surface in the axial direction. The liquid sealing member is filled in the stator accommodating portion and is cured after a predetermined time elapses.

A conventional motor includes a rotor, a stator, a circuit board, a stator accommodating portion (stator housing portion), and a sealing member (insulator). The rotor rotates about a rotation axis. The stator opposes the rotor with a gap interposed radially inward. The circuit board is connected to the stator and disposed on one side in an axial direction of the stator. The stator accommodating portion accommodates the stator and the circuit board, and has an opening on one end surface in the axial direction. The liquid sealing member is filled in the stator accommodating portion and is cured after a predetermined time elapses.

A conventional blower includes a rotor, a stator, a circuit board, a stator accommodating portion (stator housing portion), and a sealing member (insulator). The rotor rotates about a rotation axis. The stator opposes the rotor with a gap interposed radially inward. The circuit board is connected to the stator and disposed on one side in an axial direction of the stator. The stator accommodating portion accommodates the stator and the circuit board. The sealing member is filled in the stator accommodating portion.

However, in the conventional motor, there is a possibility that the uncured sealing member flows out of the stator accommodating portion along the lead wire.

In the conventional motor, there is a possibility that the sealing member bulges and is cured along the radially inner surface of the stator accommodating portion, and a fillet is formed at the radially outer end part of the sealing member. When the fillet is formed, there is a possibility that a cover covering the opening of the stator accommodating portion and the fillet come into contact with each other, and the motor becomes large in the axial direction.

In the conventional motor, there is a possibility that the sealing member bulges and is cured along the radially inner surface of the stator accommodating portion, and a fillet is formed at the radially outer end part of the sealing member. When the fillet is formed, there is a possibility that a cover covering the opening of the stator accommodating portion and the fillet come into contact with each other, and the motor becomes large in the axial direction.

In the conventional blower, the sealing member hardly flows into the entire inside of the stator accommodating portion, and there is a possibility that assembly workability of the blower is deteriorated.

SUMMARY

A motor according to a first preferred embodiment of the present disclosure includes a rotor, a stator, a stator accommodating portion, a seal, and a lid. The rotor is rotatable about a rotation axis. The stator opposes the rotor with a gap interposed radially inward. The stator accommodating portion accommodates the stator, includes an opening on one end surface in an axial direction, and has a tubular shape. The seal is filled in the stator accommodating portion. The lid covers the opening. The stator accommodating portion includes a cutout and a pullout piece. The cutout is recessed from one end in the axial direction to another side in the axial direction, and a lead wire connected to the stator is pulled out. The pullout piece protrudes radially outward from a bottom of the cutout, and the lead wire is positioned between the lid and the pullout piece via an elastic portion located on an end surface on one side in the axial direction of the pullout piece.

A motor according to a second preferred embodiment of the present disclosure includes a rotor, a stator, a circuit board, a stator accommodating portion, a seal, and a lid. The rotor is rotatable about a rotation axis. The stator opposes the rotor with a gap interposed radially inward. The circuit board is connected to the stator and located on one side in an axial direction of the stator. The stator accommodating portion accommodates the stator and the circuit board, includes an opening on one end surface in the axial direction, and has a tubular shape. The seal is filled in the stator accommodating portion, and the lid covers the opening. One end in the axial direction of the stator accommodating portion is positioned on another side in the axial direction relative to another end in the axial direction of the lid on a radially inside relative to the stator accommodating portion.

A motor according to a third preferred embodiment of the present disclosure includes a rotor, a stator, a circuit board, a stator accommodating portion, a seal, and a lid. The rotor is rotatable about a rotation axis. The stator opposes the rotor with a gap interposed radially inward. The circuit board is connected to the stator and located on one side in an axial direction of the stator. The stator accommodating portion accommodates the stator and the circuit board, includes an opening on one end surface in the axial direction, and has a tubular shape. The seal is filled in the stator accommodating portion, and the lid covers the opening. The stator includes a bearing holding portion. The bearing holding portion internally holds a bearing that rotatably supports a shaft extending along a rotation axis, and has a tubular shape. The circuit board includes a board through hole located on the rotation axis and penetrating in the axial direction. One end portion in the axial direction of the bearing holding portion is inserted into the board through hole and extends to one side in the axial direction relative to the circuit board. An oil repellent layer is provided on a radially outer surface of the bearing holding portion on one side in the axial direction relative to one end in the axial direction of the circuit board.

A blower according to a fourth preferred embodiment of the present disclosure includes a rotor, a stator, a circuit board, a stator accommodating portion, a seal, a lid, an impeller, and a housing body. The rotor is rotatable about a rotation axis. The stator opposes the rotor with a gap interposed radially inward. The circuit board is connected to the stator and located on one side in an axial direction of the stator. The stator accommodating portion accommodates the stator and the circuit board, includes an opening on one end surface in the axial direction, and has a tubular shape. The seal is filled in the stator accommodating portion. The lid covers the opening. The impeller is fixed to the rotor and generates an airflow in the axial direction. The housing body has a tubular shape extending along the rotation axis, includes two end surfaces in the axial direction opened, and accommodates the motor and the impeller. The stator accommodating portion includes an accommodating recess. The accommodating recess is located at one end portion in the axial direction of the stator accommodating portion and is recessed radially outward from the radially inner surface. In the radial direction, a gap is between a radially outer edge of the circuit board and the accommodating recess.

The above and other elements, features, steps, characteristics and advantages of the present disclosure will become more apparent from the following detailed description of the example embodiments with reference to the attached drawings.

DETAILED DESCRIPTION

Hereinafter, example embodiments of a first aspect of the present disclosure will be described in detail with reference to the drawings. In the present description, a direction in which a rotation axis J of a blower 1 extends is simply referred to as "axial" or "axial direction", a direction orthogonal to the rotation axis J about the rotation axis J of the blower 1 is simply referred to as "radial" or "radial direction", and a direction along an arc about the rotation axis J of the blower 1 is simply referred to as "circumferential" or "circumferential direction". A cross section parallel to the axial direction is referred to as "longitudinal cross section". The term "parallel" does not represent parallel in a strict sense, but includes substantially parallel.

Figure 1:
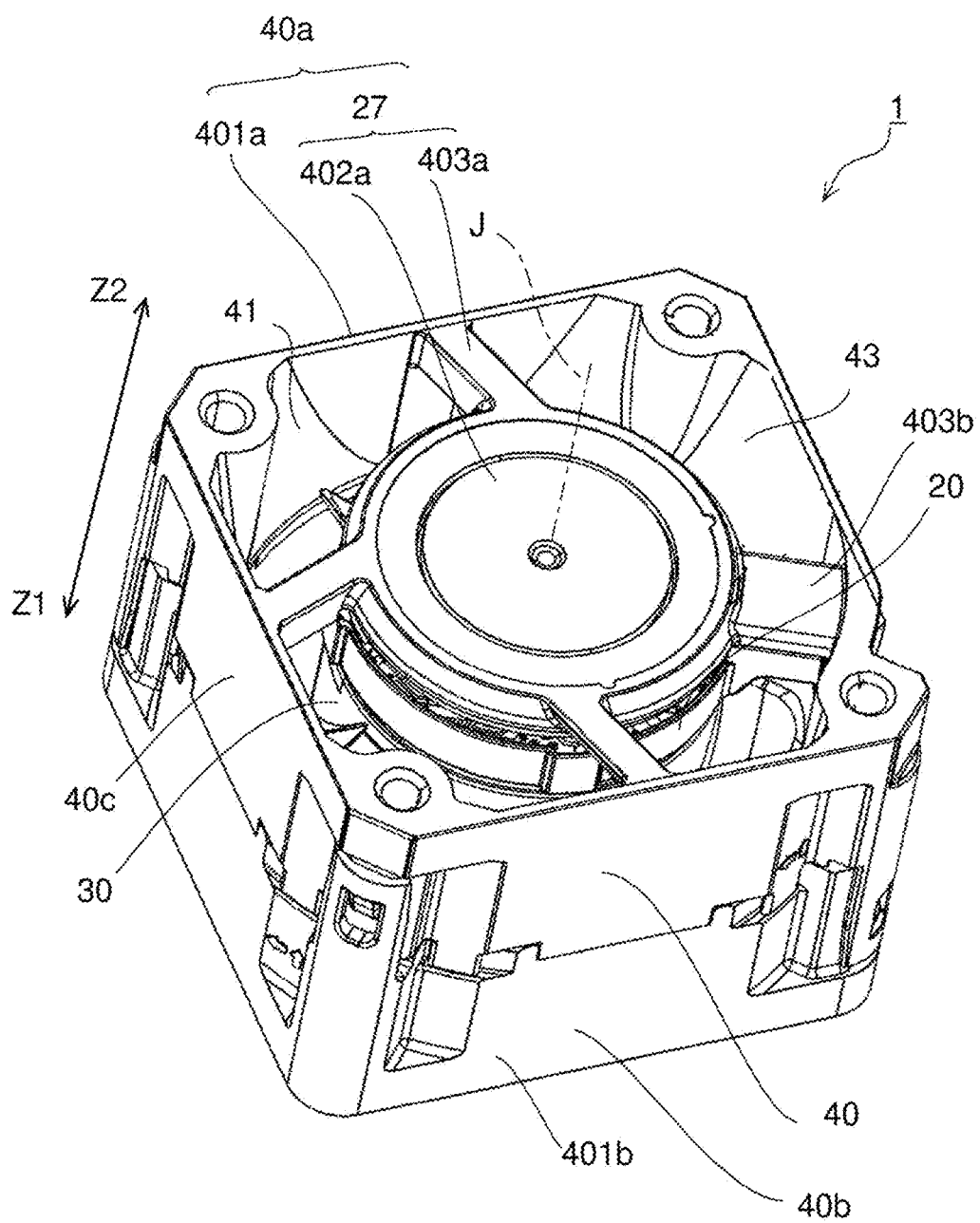
FIG. 1 is a perspective view of a blower according to a first example embodiment of the present disclosure.

It is assumed that an axial direction is a vertical direction for the sake of convenience in description, and the shape and positional relation of each part or portion will be described on the assumption that the vertical direction in FIG. 1 is a vertical direction of the blower 1. For example, one side in the axial direction is defined as an upper side in the axial direction or an upper side. The other side in the axial direction is defined as a lower side in the axial direction or a lower side. One end in the axial direction is defined as an upper end, and the other end in the axial direction is defined as a lower end. One end surface in the axial direction is defined as an upper end surface, and the other end surface in the axial direction is defined as a lower end surface. The "upper side" of the blower 1 is an "intake side" and the "lower side" of the blower 1 is an "exhaust side". It is to be noted that this definition of the vertical direction does not restrict the orientation and positional relation of the blower 1 when in use.

Figure 2:
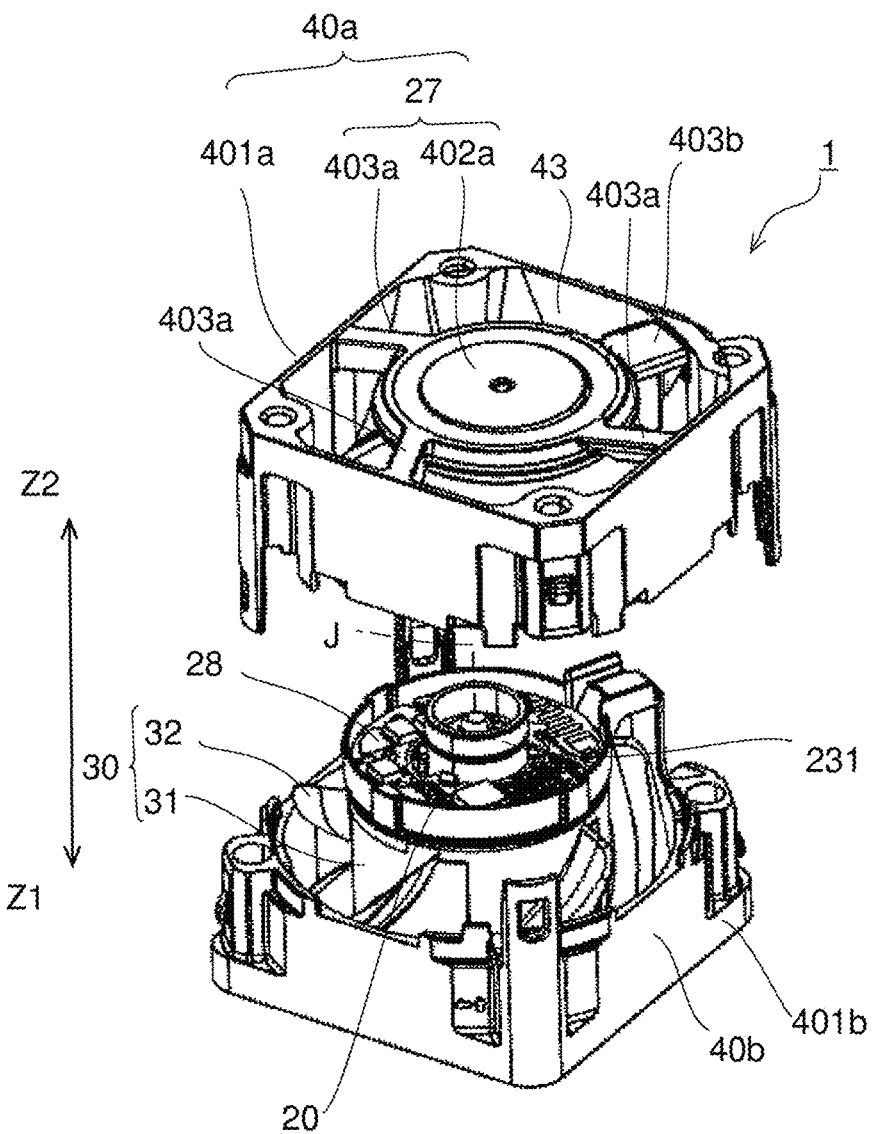
FIG. 2 is an exploded perspective view of the blower according to the first example embodiment of the present disclosure.

FIGS. 1 and 2 are a perspective view and an exploded perspective view, respectively, of an example of the blower 1 according to the first example embodiment of the present disclosure. The blower 1 includes a motor 20, an impeller 30, and a housing 40.

The impeller 30 is fixed to the motor 20 and rotates about the rotation axis J to generate an airflow on the lower side Z1 in the axial direction (the other side in the axial direction) along the rotation axis J.

The housing 40 is formed in a tubular shape extending along the rotation axis J, and has a blowing flow path 41 in which both end surfaces in the axial direction are opened and an airflow internally circulates. The motor 20 and the impeller 30 are accommodated inside the housing 40. The housing 40 has an exhaust port 42 on a lower end surface (the other end surface in the axial direction) (see FIG. 3) and an intake port 43 on an upper end side (one end surface in the axial direction).

The housing 40 is configured by axially coupling an upper housing part 40a and a lower housing part 40b. The upper housing part 40a and the lower housing part 40b are resin molded articles. In the present example embodiment, the housing 40 can be divided into the upper housing part 40a and the lower housing part 40b, but the upper housing part 40a and the lower housing part 40b may be integrally formed. The upper housing part 40a includes an upper body portion 401a, a fixing part 402a, and coupling parts 403a and 403b. The upper body portion 401a extends in the axial direction and is formed in a tubular shape.

The fixing part 402a and the coupling parts 403a and 403b constitute a lid portion 27 that covers an opening 25a (see FIG. 4) of a stator accommodating portion 25 described below. The lid portion 27 is a part of the housing 40 and also a part of the motor 20. The fixing part 402a is arranged on an upper side Z2 in the axial direction (one side in the axial direction) of the stator accommodating portion 25 described below, and has a disk shape expanding in the radial direction about the rotation axis J. A stator 23 described below of the motor 20 is fixed to the fixing part 402a. That is, the fixing part 402a is formed in a plate shape to which the stator 23 is fixed.

The coupling parts 403a and 403b extend radially outward from the fixing part 402a and couple the fixing part 402a and a housing body portion 40c. A plurality of the coupling parts 403a are arranged in the circumferential direction and axially opposes an accommodating recess 252a described below. The coupling part 403b is disposed at one position in the circumferential direction and axially opposes a pullout piece 2522 described below. The air circulating through the blowing flow path 41 passes through between the adjacent coupling parts 403a and 403b.

The coupling part 403a is formed to be inclined to one side in the circumferential direction from the radially inner end toward the radially outside. Due to this, the airflow flowing into the housing 40 from the intake port 43 smoothly circulates along the coupling part 403a. Therefore, the blowing efficiency of the blower 1 can be further improved. The coupling part 403a may be formed to be inclined to the other side in the circumferential direction from the radially inner end toward the radially outside. The coupling part 403a may be formed to extend linearly in the radial direction. The coupling part 403b is formed to extend linearly in the radial direction.

Figure 4:
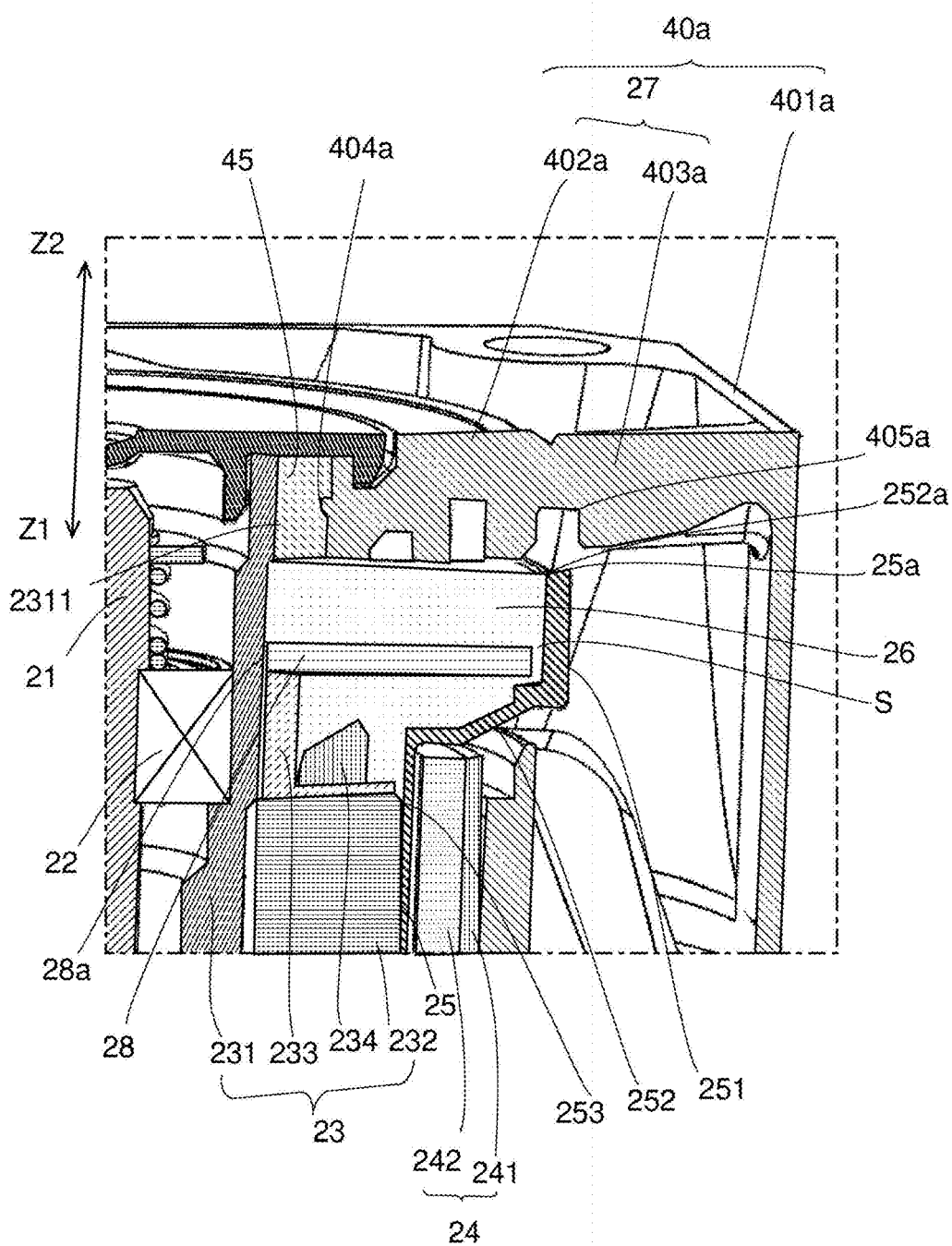
FIG. 4 is a longitudinal cross-sectional perspective view showing a portion of the blower according to the first example embodiment of the present disclosure in an enlarged manner.

The coupling part 403a has a coupling recess 405a (see FIG. 4). The coupling recess 405a is disposed to oppose the stator accommodating portion 25 in the axial direction, and is recessed to the one side in the axial direction from the lower end surface (end surface on the other side in the axial direction) of the coupling part 403a. This can prevent the stator accommodating portion 25 from coming into contact with the coupling part 403 when swung in the axial direction.

The lower housing part 40b has a lower body portion 401b that extends in the axial direction and is formed in a tubular shape. The lower body portion 401b and the upper body portion 401a are coupled in the axial direction to constitute the housing body portion 40c. That is, the blower 1 includes the housing body portion 40c, and the housing body portion 40c is formed in a tubular shape extending along the rotation axis J, and internally has the blowing flow path 41 with both end surfaces in the axial direction opened. The motor 20 and the impeller 30 are accommodated inside the housing body portion 40c.

The impeller 30 includes an impeller cup 31 and a plurality of blades 32. The impeller cup 31 is fixed to a radially outside of a rotor 24 described below of the motor 20. The plurality of blades 32 are arrayed in the circumferential direction on a radially outer surface of the impeller cup 31.

Figure 3:
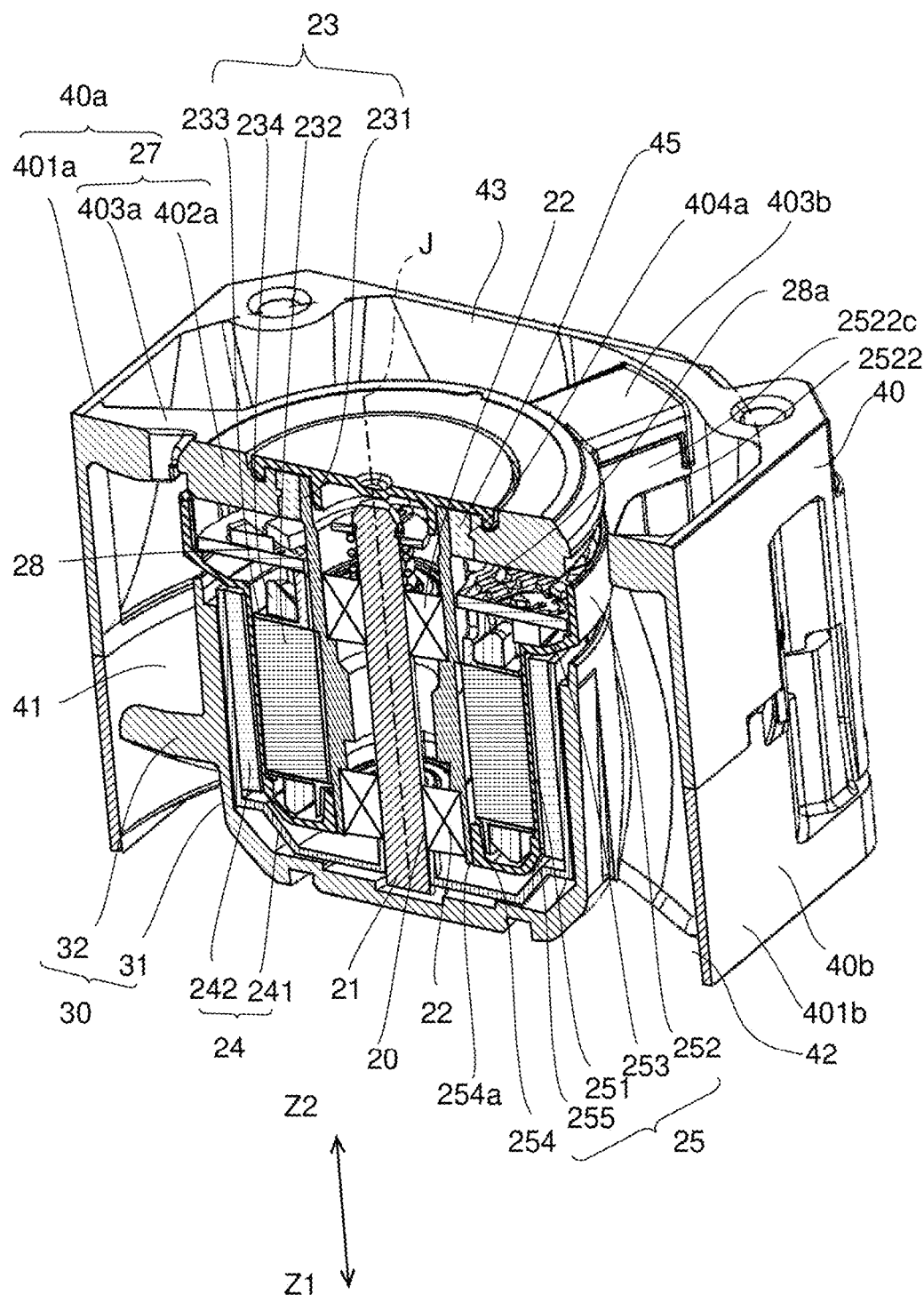
FIG. 3 is a longitudinal cross-sectional perspective view of the blower according to the first example embodiment of the present disclosure.

FIG. 3 is a longitudinal cross-sectional perspective view of the blower 1, and FIG. 4 is a longitudinal cross-sectional perspective view showing a part of the blower 1 in an enlarged manner. The motor 20 includes a shaft 21, a bearing 22, the stator 23, the rotor 24, the stator accommodating portion 25, a seal 26, the above-described lid portion 27, and a circuit board 28.

The shaft 21 extends along the rotation axis J. The shaft 21 is a columnar member that is made of metal such as stainless steel and extends in the axial direction.

The bearings 22 are arranged in a pair at least spaced apart in the axial direction. The bearing 22 is configured by, for example, a ball bearing, but may be configured by a sleeve bearing or the like. The pair of bearings 22 support the shaft 21 so as to be rotatable about the rotation axis J with respect to the stator 23.

The stator 23 opposes the rotor 24 with a gap interposed radially inward. The stator 23 includes a bearing holding portion 231, a stator core 232, an insulator 233, and a coil 234. The bearing holding portion 231 is formed in a cylindrical shape and internally holds the bearing 22.

An upper end portion (one end portion in the axial direction) of the bearing holding portion 231 is fitted via a connector 45 into a fitting hole 404a of the fixing part 402a. Due to this, the bearing holding portion 231 is fixed to the fixing part 402a, and the stator 23 and the housing 40 are fixed. The fitting hole 404a is formed to penetrate the fixing part 402a in the axial direction. The connector 45 is formed in an annular shape and is disposed on the inner peripheral surface of the fitting hole 404a. The bearing holding portion 231 is disposed on the inner peripheral surface of the connector 45. A lower end portion (the other end portion in the axial direction) of the bearing holding portion 231 is fixed to the stator accommodating portion 25 described below. The upper end portion (one end portion in the axial direction) of the bearing holding portion 231 may be directly fitted into the fitting hole 404a without the connector 45.

The stator core 232 is formed by vertically stacking electromagnetic steel plates such as silicon steel plates. The insulator 233 is made of an insulating resin. The stator core 232 includes an annular core back (not shown) and a plurality of teeth (not shown) protruding radially outward from the core back and arranged in the circumferential direction. The insulator 233 is provided on a part of the outer surface in the axial direction of the teeth and a part of the outer surface in the circumferential direction of the teeth. The coil 234 is formed of a conductive wire wound around the stator core 232 via the insulator 233.

The rotor 24 rotates about the rotation axis J with respect to the stator 23. The rotor 24 includes a rotor yoke 241 and a magnet 242.

The rotor yoke 241 is a member in a substantially cylindrical shape made of a magnetic material and having a lid on portion (the other end portion in the axial direction) of the shaft 21. The magnet 242 has a cylindrical shape and is fixed to an inner peripheral surface of the rotor yoke 241. Due to this, the magnet 242 is disposed on the radially outside of the stator 23.

The circuit board 28 is in contact with the upper end (one end in the axial direction) of the insulator 233 and is disposed between the stator core 232 and the lid portion 27. The circuit board 28 has a disk shape expanding in the radial direction about the rotation axis J, for example. The circuit board 28 has a board through hole 28a. The board through hole 28a is disposed on the rotation axis J and penetrates in the axial direction. The upper end portion (one end portion in the axial direction) of the bearing holding portion 231 is inserted into the board through hole 28a and extends in the upper side Z2 in the axial direction (one side in the axial direction) relative to the circuit board 28.

A conductive wire (not shown) constituting the coil 234 is electrically connected to the circuit board 28. An electronic circuit for supplying a drive current to the coil 234 is mounted on the circuit board 28. The circuit board 28 is connected to a lead wire 50 (see FIGS. 6 and 7), and the lead wire 50 is pulled out to the outside of the stator accommodating portion 25 and connected to an external power source. The lead wire 50 is electrically connected to the coil 234, and the lead wire 50 and the stator 23 are electrically connected. In the present example embodiment, three lead wires 50 are pulled out to the outside of the stator accommodating portion 25.

Figure 5:
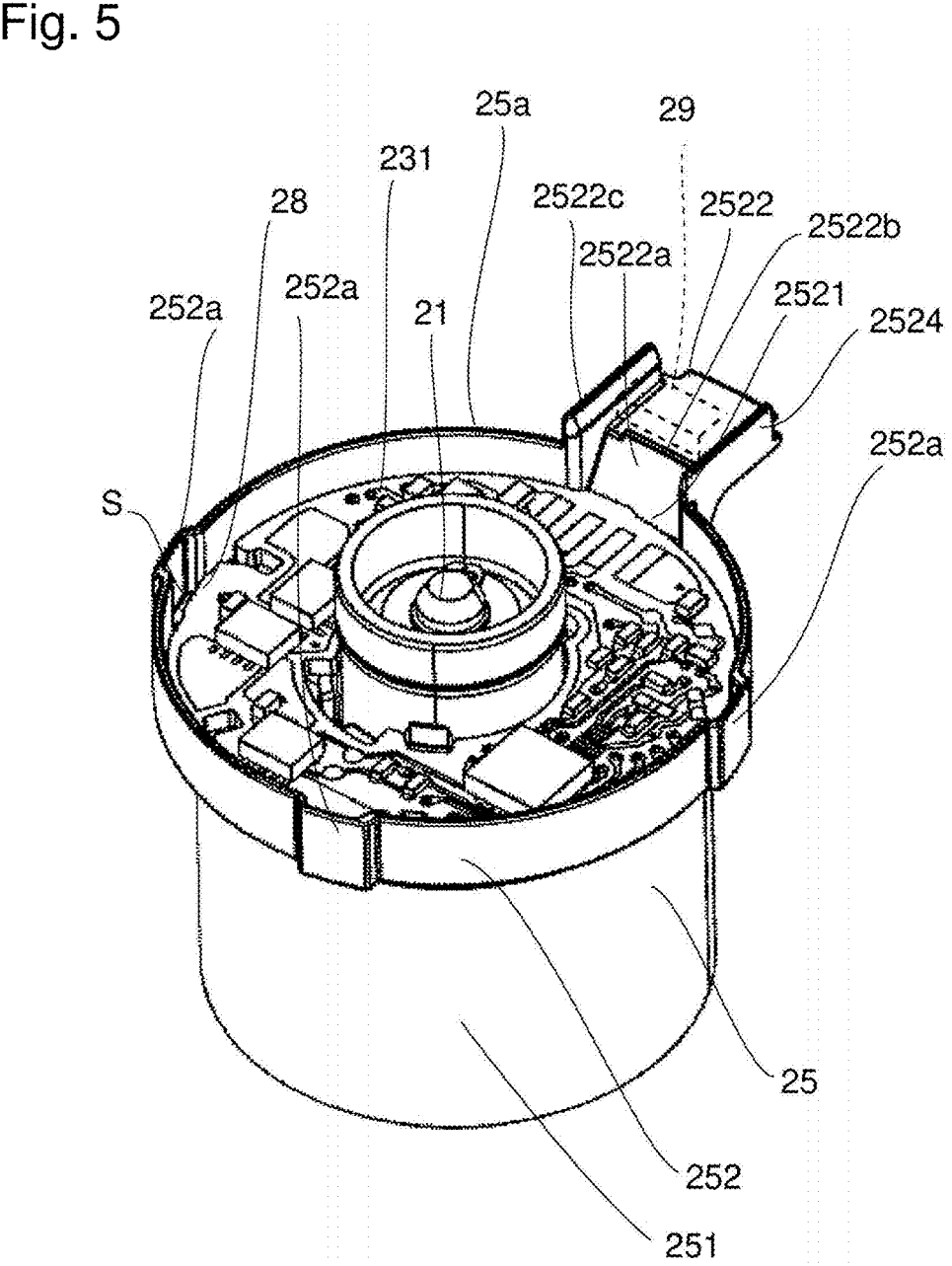
FIG. 5 is a perspective view of a motor according to the first example embodiment of the present disclosure.
Figure 6:
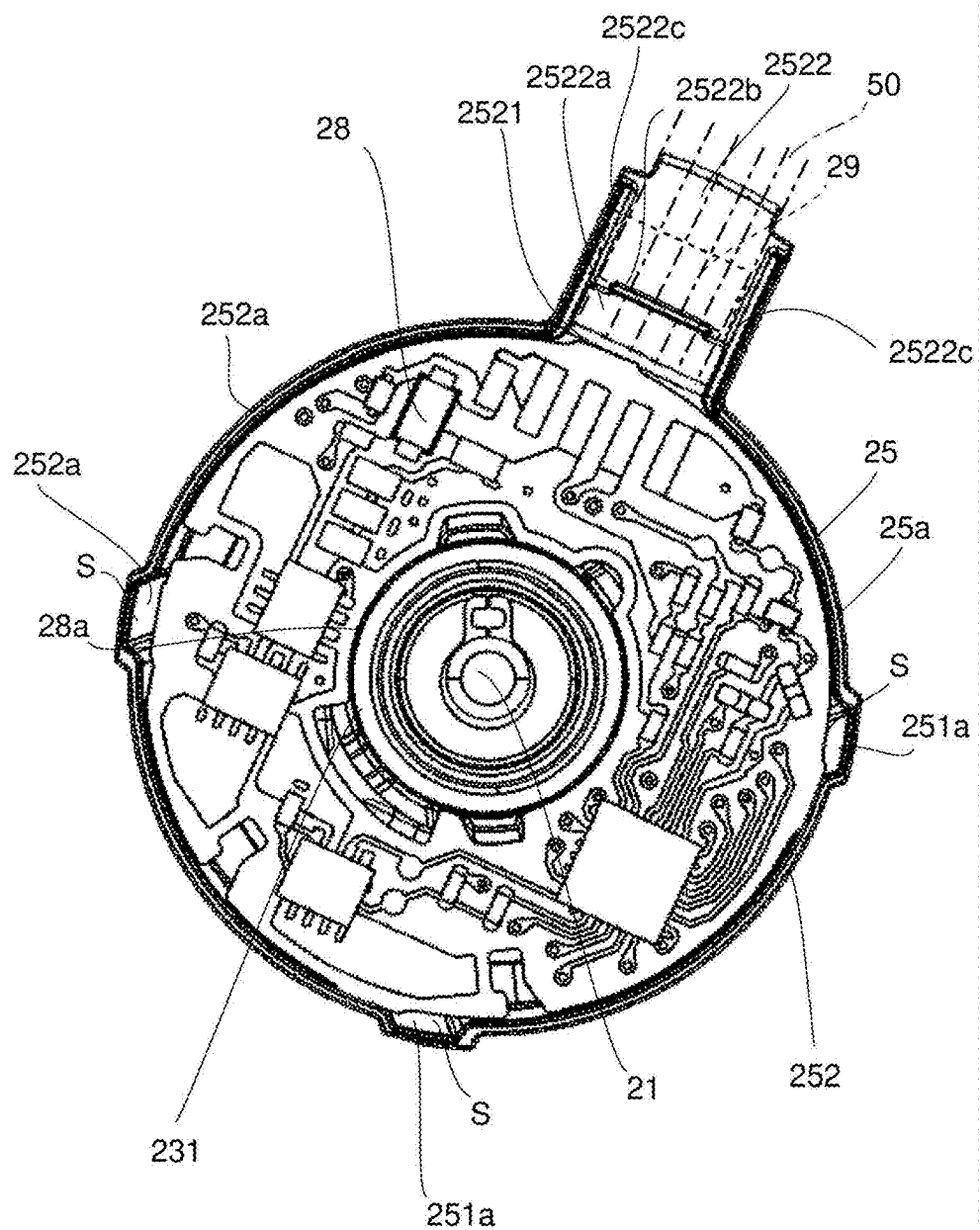
FIG. 6 is a top view of the motor according to the first example embodiment of the present disclosure.
Figure 7:
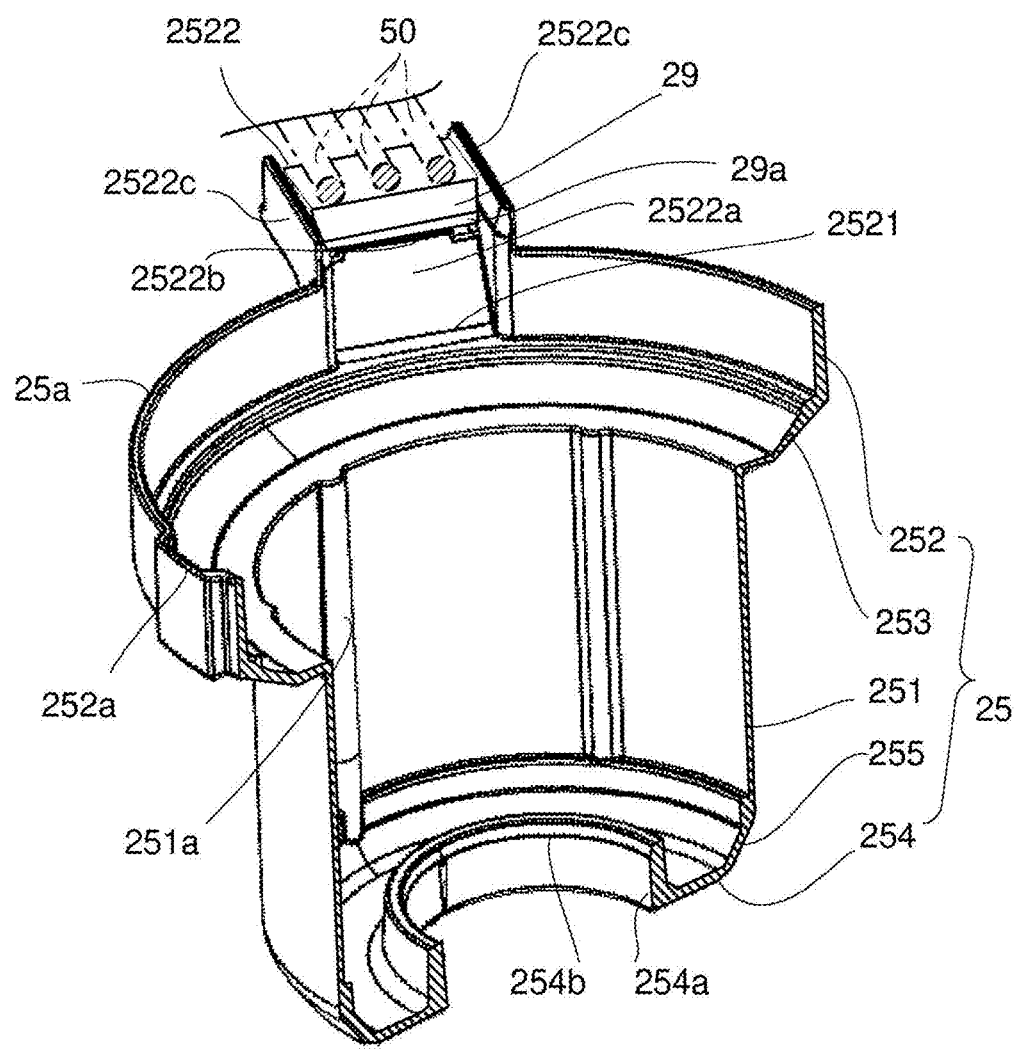
FIG. 7 is a longitudinal cross-sectional perspective view of a stator accommodating portion of the motor according to the first example embodiment of the present disclosure.

FIGS. 5 and 6 are a perspective view and a top view, respectively, of the motor 20, and FIG. 7 is a longitudinal cross-sectional perspective view of the stator accommodating portion 25. In FIGS. 5 and 6, the rotor 24, the seal 26, and the lid portion 27 are not shown, and the elastic portion 29 is indicated by a broken line. In FIG. 5, the lead wire 50 is not shown, and in FIGS. 6 and 7, the lead wire 50 is indicated by an alternate long and short dash line.

The stator accommodating portion 25 is formed in a tubular shape and has the opening 25*a* on one end surface in the axial direction (end surface on one side in the axial direction). The stator accommodating portion 25 internally accommodates the shaft 21, the bearing 22, the stator 23, and the circuit board 28. The stator accommodating portion 25 is filled with the seal 26 (see FIG. 4). Due to this, the shaft 21, the bearing 22, the stator 23, and the circuit board 28 are integrated, and the assembly workability of the motor 20 is improved.

The stator core 232 is press-fitted into the inner peripheral surface of the stator accommodating portion 25. At this time, the radially outer surfaces of the teeth (not shown) come into contact with the inner peripheral surface of the stator accommodating portion 25. The outer peripheral surface of the stator accommodating portion 25 opposes the magnet 242 in the radial direction with a gap interposed (see FIG. 3).

The seal 26 is formed of a curable insulating resin or the like, and for example, an epoxy resin, silicone rubber, a polyurethane resin, or the like is used. The liquid seal 26 is filled inside the stator accommodating portion 25 from the opening 25*a* and is cured after a predetermined time elapses. Due to this, the stator 23 and the circuit board 28 are covered with the cured seal 26, and waterproof property, oil proof property, and the like of the stator 23 and the circuit board 28 are improved.

The stator accommodating portion 25 includes a stator tube portion 251, a board tube portion 252, an intermediate tube portion 253, an accommodating lid portion 254, and an accommodating inclined portion 255.

The stator tube portion 251 surrounds the stator 23 from circuit board 28 from radially outside. The intermediate tube portion 253 couples the stator tube portion 251 and the board tube portion 252.

The accommodating lid portion 254 covers the stator 23 from the lower side Z1 in the axial direction (the other side in the axial direction) and expands in the radial direction. The accommodating lid portion 254 has an accommodating through hole 254*a* and an accommodating holding portion 254*b* penetrating in the axial direction. The lower end portion (the other end portion in the axial direction) of the bearing holding portion 231 is fitted into the accommodating through hole 254*a* (see FIG. 3). Due to this, the stator accommodating portion 25 is fixed to the bearing holding portion 231. The accommodating holding portion 254*b* protrudes in the upper side Z2 in the axial direction (one side in the axial direction) from the peripheral edge of the accommodating through hole 254*a*, and is formed in a tubular shape. The accommodating holding portion 254*b* holds the lower end portion (the other end portion in the axial direction) of the bearing holding portion 231.

The board tube portion 252 has the accommodating recess 252*a*. The accommodating recess 252*a* is arranged in the upper end portion (one end portion in the axial direction) of the stator accommodating portion 25 and is recessed radially outward from the radially inner surface. In the radial direction, a gap S is formed between the radially outer edge of the circuit board 28 and the accommodating recess 252*a*. In the present example embodiment, the accommodating recess 252*a* has a part of the board tube portion 252 formed in a convex shape radially outside, and is provided at three places at equal intervals in the circumferential direction. The number of accommodating recesses 252*a* is not limited to three. By providing the accommodating recess 252*a*, the seal 26 can smoothly flow into the stator accommodating portion 25 from the gap S. This improves the assembling workability of the blower 1.

As viewed from the axial direction, at least a part of the accommodating recess 252*a* overlaps the coupling part 403*a* of the lid portion 27 (see FIG. 4). In the present example embodiment, the circumferential width of the accommodating recess 252*a* is equal to or less than the circumferential width of the coupling part 403*a*, and the entire accommodating recess 252*a* overlaps the coupling part 403*a* as viewed from the axial direction. This can reduce the airflow that passes through between the adjacent coupling parts 403*a* and flows into the housing 40 from being disturbed in the vicinity of the accommodating recess 252*a*. Therefore, the blowing efficiency of the blower 1 can be improved.

The radial protrusion amount of the accommodating recess 252*a* is ½ or less of the radial size of the coupling part 403*a*. This can further reduce the airflow that passes through between the adjacent coupling parts 403*a* and flows into the housing 40 from being disturbed in the vicinity of the accommodating recess 252*a*. It is preferable that the radial protrusion amount of the accommodating recess 252*a* is smaller as long as a predetermined size of the gap S is secured.

The intermediate tube portion 253 is inclined radially inward toward the lower side Z1 in the axial direction (the other side in the axial direction). This allows the seal 26 to smoothly flow into the stator tube portion 251 from the board tube portion 252 along the intermediate tube portion 253.

The accommodating inclined portion 255 couples the stator tube portion 251 and the accommodating lid portion 254 and is inclined radially inward toward the lower side Z1 in the axial direction (the other side in the axial direction). This allows the seal 26 to smoothly flow into the radially inside of the along the accommodating inclined portion 255. The resin amount of the seal 26 can be reduced, and the manufacturing cost can be reduced.

The stator accommodating portion 25 has an accommodating projection 251*a* that protrudes from the radially inner surface and extends in the axial direction (see FIG. 7). In the present example embodiment, the accommodating projection 251*a* is disposed on the radially inner surface of the stator tube portion 251. The accommodating projection 251*a* is fitted into a groove (not shown) formed on the radially outer surface of the stator core 232 and extending in the axial direction. This enables easy positioning in the circumferential direction of the stator core 232 in the stator accommodating portion 25. In a state where the stator core 232 is accommodated in the stator accommodating portion 25, the accommodating projection 251*a* is press-fitted between teeth (not shown) adjacent in the circumferential direction.

The stator accommodating portion 25 further includes a cutout 2521 and the pullout piece 2522.

The cutout 2521 is recessed from the upper end (one end in the axial direction) of the stator accommodating portion 25 to the lower side Z1 in the axial direction (the other side in the axial direction), and the lead wire 50 is pulled out radially outward (see FIG. 7).

The pullout piece 2522 protrudes radially outward from the bottom of the cutout 2521, and is formed in a plate shape. The elastic portion 29 in a rectangular parallelepiped shape is disposed on the upper surface (end surface on one side in the axial direction) of the pullout piece 2522. The lead wire 50 is disposed on the upper surface (end surface on one side in the axial direction) of the elastic portion 29. The upper end (one end in the axial direction) of the elastic portion 29 is disposed on the upper side Z2 in the axial direction (one side in the axial direction) relative to the upper end (one end in the axial direction) of the board tube portion 252.

Due to this, even when flowing out to the outside of the cutout 2521, the seal 26 before being cured is dammed by the elastic portion 29. Therefore, the seal 26 before being cured can be prevented from flowing out of the stator accommodating portion 25 via the cutout 2521. At this time, the upper end (one end in the axial direction) of the elastic portion 29 is disposed on the upper side Z2 in the axial direction (one side in the axial direction) relative to the upper end (one end in the axial direction) of the cured seal 26.

The elastic portion 29 is fixed to the pullout piece 2522 via an adhesive layer 29a (see FIG. 7). This allows the elastic portion 29 to be easily fixed to the pullout piece 2522, and improves the assembling workability of the motor 20. The elastic portion 29 is made of, for example, a rubber portion.

By providing the pullout piece 2522, the lead wire 50 can be pulled out radially outward while being supported by the pullout piece 2522 without being largely bent in the axial direction. Therefore, damage to the lead wire 50 can be prevented.

The pullout piece 2522 includes a pullout inclined portion 2522a, a pullout projection 2522b, and a pair of pullout wall portions 2522c. The pullout inclined portion 2522a is inclined in the upper side Z2 in the axial direction (one side in the axial direction) toward radially outward from the bottom of the cutout 2521. By providing the pullout inclined portion 2522a, the seal 26 before being cured can be further prevented from flowing out to the outside of the stator accommodating portion 25 via the cutout 2521.

The pullout projection 2522b is disposed adjacent to the radially outside of the cutout 2521 and protrudes from the upper surface (end surface on one side in the axial direction) of the the elastic portion 29 can be easily positioned.

The pullout wall portion 2522c protrudes in the upper side Z2 in the axial direction (one side in the axial direction) from both end portions in the radial direction of the pullout piece 2522 and extends in the radial direction. The radially inner end of the pullout wall portion 2522c is coupled to the outer peripheral surface of the board tube portion 252. The upper end (one end in the axial direction) of the pullout wall portion 2522c is disposed in the upper side Z2 in the axial direction (one side in the axial direction) relative to the upper end (one end in the axial direction) of the board tube portion 252. Due to this, the seal 26 before being cured can be further prevented from flowing out to the outside of the stator accommodating portion 25 via the cutout 2521.

The pullout piece 2522 is arranged to oppose the coupling part 403b (lid portion 27) in the axial direction. At this time, the lead wire 50 is sandwiched between the coupling part 403b (lid portion 27) and the pullout piece 2522 via the elastic portion 29. At this time, the elastic portion 29 deforms along the outer peripheral surface of the lead wire 50, and a minute gap is hardly generated between the lead wire 50 and the elastic portion 29. This can prevent the seal 26 before being cured from passing through between the lead wire 50 and the elastic portion 29 due to a capillary phenomenon along the lead wire 50. Therefore, the seal 26 can be prevented from flowing out to the outside of the stator accommodating portion 25. This can provide the motor 20 that can prevent the seal 26 from flowing out.

Figure 8:
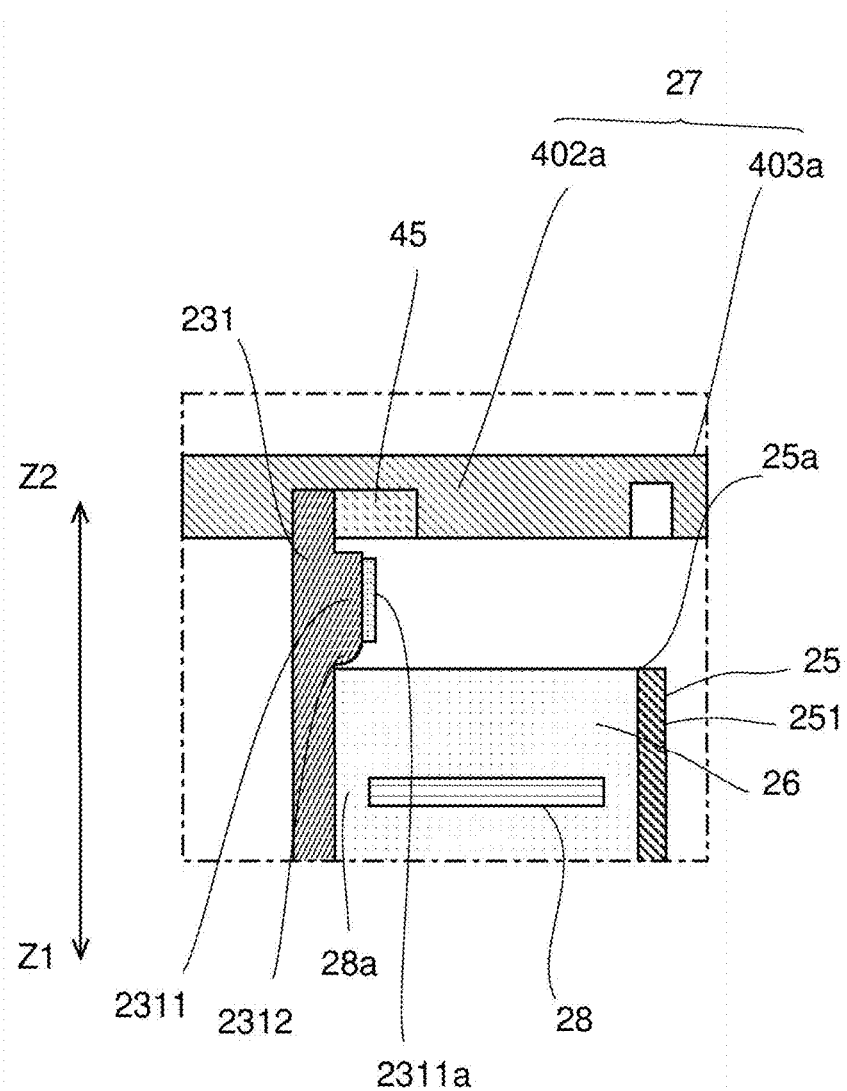
FIG. 8 is a longitudinal cross-sectional view schematically showing a portion of the motor according to the first example embodiment of the present disclosure.

FIG. 8 is a longitudinal cross-sectional view schematically showing a part of the motor 20. The upper end (one end in the axial direction) of the stator accommodating portion 25 is positioned in the lower side Z1 in the axial direction (the other side in the axial direction) relative to the lower end (the other end in the axial direction) of the lid portion 27 on the radially inside relative to the upper end (one end in the axial direction) of the stator accommodating portion 25.

There is a possibility that the seal 26 bulges and is cured in the upper side Z2 in the axial direction (one side in the axial direction) along the radially inner surface of the stator accommodating portion 25, and a fillet is formed at the radially outer end portion of the seal 26. The fillet does not bulge in the upper side Z2 of the axial direction (one side in the axial direction) beyond the upper end (one end in the axial direction) of the stator accommodating portion 25. Due to this, even when a fillet is formed along the radially inner surface of the stator accommodating portion 25, the upper end (one end in the axial direction) of the fillet is positioned in the lower side Z1 in the axial direction (the other side in the axial direction) relative to the lower end (the other end in the axial direction) of the lid portion 27. Therefore, the lid portion 27 covering the opening 25a and the seal 26 can be prevented from coming into contact with each other. This can downsize the motor 20 in the axial direction.

In the present example embodiment, the seal 26 is filled up to the upper end (one end in the axial direction) of the stator accommodating portion 25, and the upper end (one end in the axial direction) of the cured seal 26 is disposed at the same height in the axial direction as the upper side Z2 in the axial direction (one side in the axial direction) relative to the upper end (one end in the axial direction) of the stator accommodating portion 25 or the one end in the axial direction of the stator accommodating portion 25. At this time, at the radially outer end portion of the seal 26, a fillet is not formed along the radially inner surface of the stator accommodating portion 25. Therefore, it is possible to reduce variation, for each product, in the height of the upper end (end surface on one side in the axial direction) of the seal 26. This allows the lid portion 27 to be disposed close to the upper end (one end in the axial direction) of the stator accommodating portion 25 while preventing the lid portion 27 and the seal 26 from coming into contact with each other. Therefore, it is possible to further downsize the motor 20 in the axial direction.

The upper end surface (end surface on one side in the axial direction) of the seal 26 is formed orthogonal to the axial direction. This allows the lid portion 27 to be disposed closer to the upper end (one end in the axial direction) of the stator accommodating portion 25.

When the upper end (one end in the axial direction) of the cured seal 26 is disposed in the lower side Z1 in the axial direction (the other side in the axial direction) relative to the upper end (one end in the axial direction) of the stator accommodating portion 25, the upper end (one end in the axial direction) of the stator accommodating portion 25 can be disposed close to the lid portion 27. At this time, the coupling recess 405a is formed in the lower end surface (the end surface on the other side in the axial direction) of the coupling part 403a, and it is possible to prevent the upper end (one end in the axial direction) of the stator accommodating portion 25 and the lid portion 27 from coming into contact with each other.

The upper end (one end in the axial direction) of the bearing holding portion 231 extends to the upper side Z2 in the axial direction (one side in the axial direction) relative to the upper end (one end in the axial direction) of the stator accommodating portion 25 and is fixed to the lid portion 27. This allows the lid portion 27 and the stator accommodating portion 25 to be easily fixed with a small number of components via the bearing holding portion 231 in a state where the lid portion 27 and the upper end portion of the stator accommodating portion 25 filled with the seal 26 are not in contact with each other.

The bearing holding portion 231 has a holding protrusion 2311. The holding protrusion 2311 is disposed the upper side Z2 in the axial direction (one side in the axial direction) relative to the upper end (one end in the axial direction) of the circuit board 28. The holding protrusion 2311 protrudes radially outward from the radially outer surface and is formed in an annular shape. The lower end (the other end in the axial direction) of the holding protrusion 2311 is positioned at substantially the same height as the upper end (one end in the axial direction) of the stator accommodating portion 25 in the axial direction. The holding protrusion 2311 may be integrated with or separated from the bearing holding portion 231. When the holding protrusion 2311 is separated from the bearing holding portion 231, the holding protrusion 2311 is attached to the bearing holding portion 231 after the circuit board 28 is disposed on the upper end (one end in the axial direction) of the insulator 233. This improves assembly workability of the circuit board 28.

When the seal 26 is about to be cured bulging to the upper side Z2 in the axial direction (one side in the axial direction) along the radially outer surface of the bearing holding portion 231, the holding protrusion 2311 can suppress rise of the seal 26. This can prevent the lid portion 27 covering the opening 25*a* and the seal 26 from coming into contact with each other. By arranging the lower end (the other end in the axial direction) of the holding protrusion 2311 at substantially the same height as the upper end (one end in the axial direction) of the stator accommodating portion 25 in the axial direction, the upper end surface (the end surface on one side in the axial direction) of the seal 26 orthogonal to the axial direction can be easily formed when the seal 26 is filled up to the upper end (one end in the axial direction) of the stator accommodating portion 25.

The radially outer end of the holding protrusion 2311 is positioned radially outside relative to the peripheral edge of the board through hole 28*a*. Due to this, the holding protrusion 2311 further protrudes radially outward, and the rise of the seal 26 can be more reliably suppressed.

The holding protrusion 2311 has a curved surface 2312. The curved surface 2312 is disposed at the other end portion in the axial direction of the holding protrusion 2311, is inclined to the upper side Z2 in the axial direction (one side in the axial direction) toward the radially outside, and is curved convexly toward the radially outside. This allows the holding protrusion 2311 to more reliably suppress the rise of the seal 26.

A plurality of grooves 2311*a* are formed on the radially outer surface of the holding protrusion 2311. Forming the groove 2311*a* makes it difficult to form a fillet along the radially outer surface of the holding protrusion 2311 when the seal 26 is cured. Therefore, the holding protrusion 2311 can suppress rise of the seal 26 more reliably. The groove 2311*a* is formed by knurling, for example.

Figure 9:
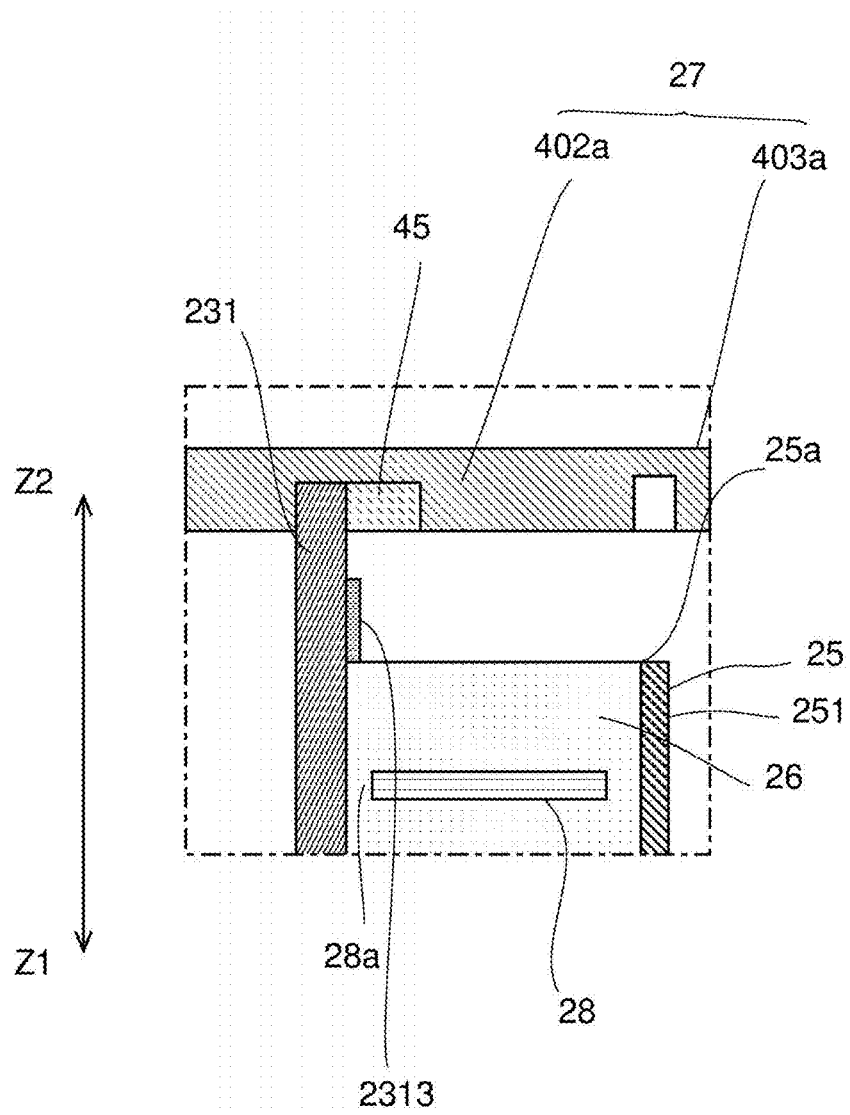
FIG. 9 is a longitudinal cross-sectional view schematically showing a portion of a motor according to a second example embodiment of the present disclosure.

Next, the second example embodiment of the present disclosure will be described. FIG. 9 is a longitudinal cross-sectional view schematically showing a part of the motor 20. For the sake of convenience in description, the same reference numerals are given to the same parts as those of the first example embodiment shown in FIGS. 1 to 8. The second example embodiment is different from the first example embodiment in that an oil repellent layer 2313 is formed on a radially outer surface of the bearing holding portion 231 in place of the holding protrusion 2311. Other parts are the same as those in the first example embodiment.

The oil repellent layer 2313 is disposed in the upper side Z2 in the axial direction (one side in the axial direction) relative to the upper end (one end in the axial direction) of the circuit board 28. The oil repellent layer 2313 includes, for example, a fluororesin, and repels the seal 26.

Due to this, the seal 26 is repelled by the oil repellent layer 2313 when the seal 26 is about to be cured bulging to the upper side in the axial direction (one side in the axial direction) along the radially outer surface of the bearing holding portion 231. Therefore, the oil repellent layer 2313 can suppress rise of the seal 26. This can prevent the lid portion 27 covering the opening 25*a* and the seal 26 from coming into contact with each other.

The lower end (the other end in the axial direction) of the oil repellent layer 2313 is positioned at substantially the same height as the upper end (one end in the axial direction) of the stator accommodating portion 25 in the axial direction. Due to this, the upper end surface (the end surface on one side in the axial direction) of the seal 26 orthogonal to the axial direction can be easily formed when the seal 26 is filled up to the upper end (one end in the axial direction) of the stator accommodating portion 25. While the oil repellent layer 2313 is formed on the radially outer surface of the bearing holding portion 231 in the present example embodiment, the oil repellent layer 2313 may be formed on the radially outer surface of the holding protrusion 2311 of the first example embodiment.

Figure 10:
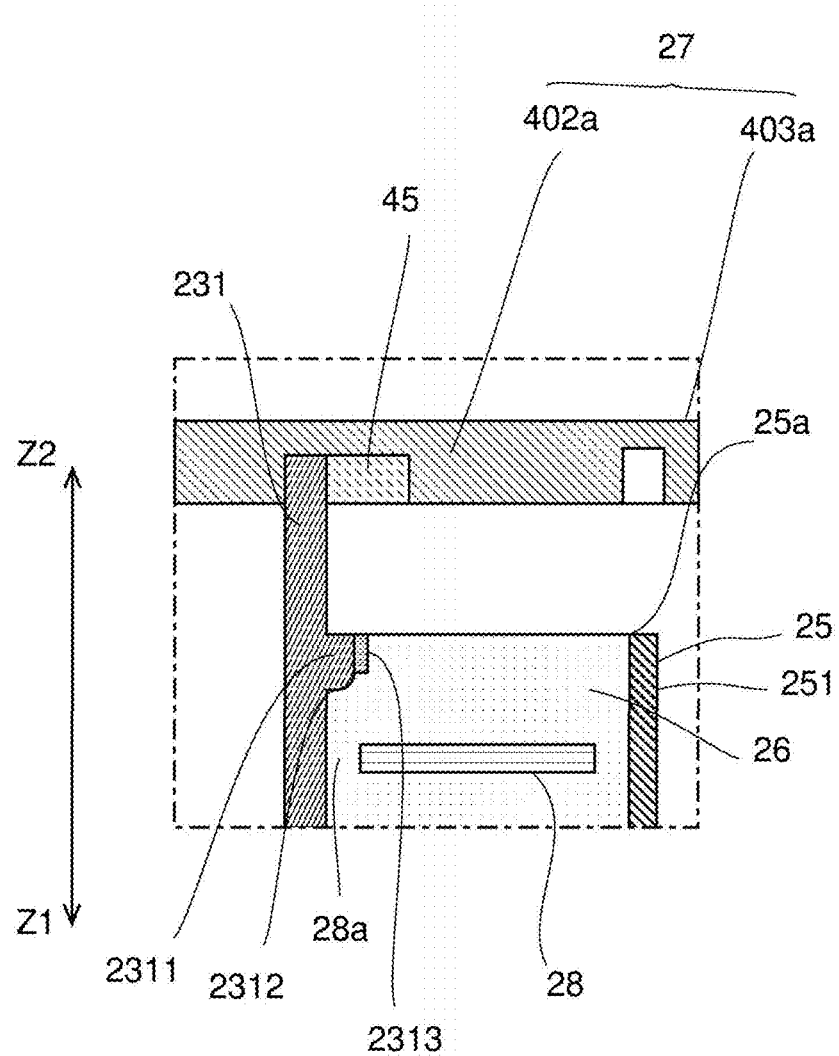
FIG. 10 is a longitudinal cross-sectional view schematically showing a portion of a motor according to a third example embodiment of the present disclosure.

Next, the third example embodiment of the present disclosure will be described. FIG. 10 is a longitudinal cross-sectional view schematically showing a part of the motor 20. For the sake of convenience in description, the same reference numerals are given to the same parts as those of the first example embodiment shown in FIGS. 1 to 8. The third example embodiment is different from the first example embodiment in the position of the holding protrusion 2311. Other parts are the same as those in the first example embodiment.

The upper end (one end in the axial direction) of the holding protrusion 2311 is positioned at substantially the same height as one end in the axial direction of the stator accommodating portion 25 in the axial direction. When the seal 26 is filled up to the upper end (one end in the axial direction) of the stator accommodating portion 25, the seal 26 is hardly cured bulging to the upper side Z2 in the axial direction (one side in the axial direction) along the radially outer surface of the bearing holding portion 231 from the upper end of the holding protrusion 2311. Therefore, at the radially inner end portion of the seal 26, a fillet is not formed along the radially outer surface of the bearing holding portion 231 beyond the holding protrusion 2311. Therefore, it is possible to reduce variation, for each product, in the height of the upper end (end surface on one side in the axial direction) of the seal 26.

The holding protrusion 2311 may be integrated with or separated from the bearing holding portion 231. When the holding protrusion 2311 is separated from the bearing holding portion 231, the holding protrusion 2311 is attached to the bearing holding portion 231 after the circuit board 28 is disposed on the upper end (one end in the axial direction) of the insulator 233. This improves assembly workability of the circuit board 28.

The example embodiments of the present disclosure have been described above. The scope of the present disclosure is not limited to the above-described example embodiments. The present disclosure can be implemented with various modifications within a scope not departing from the gist of the disclosure. The above-described example embodiments can be appropriately and optionally combined. For example, the oil repellent layer 2313 may be formed in which the groove 2311*a* of the first example embodiment is formed.

Hereinafter, exemplary example embodiments of a second aspect of the present disclosure will be described in detail with reference to the drawings.

(1)
A motor including:
a rotor that rotates about a rotation axis;
a stator that opposes the rotor with a gap interposed radially inward;
a circuit board connected to the stator and disposed on one side in an axial direction of the stator;
a stator accommodating portion in a tubular shape that accommodates the stator and the circuit board and has an opening on one end surface in the axial direction;
a seal filled in the stator accommodating portion; and
a lid portion that covers the opening,
in which one end in the axial direction of the stator accommodating portion is positioned on another side in the axial direction relative to another end in the axial direction of the lid portion on a radially inside relative to the stator accommodating portion.

(2)
A motor, in which one end in the axial direction of the seal is disposed at a same height in the axial direction as one side in the axial direction or the one end in the axial direction of the stator accommodating portion relative to the one end in the axial direction of the stator accommodating portion.

(3)
A motor, in which an end surface of the seal on one side in the axial direction is orthogonal to the axial direction.

(4)
A motor, in which
the stator includes
a bearing holding portion in a tubular shape that internally holds a bearing that rotatably supports a shaft extending along the rotation axis,
the circuit board has a board through hole that is disposed on the rotation axis and penetrates the circuit board in the axial direction, and
one end portion in the axial direction of the bearing holding portion is inserted into the board through hole, extends to one side in the axial direction relative to the circuit board, and is fixed to the lid portion.

(5)
A motor, in which
the bearing holding portion includes
a holding protrusion in an annular shape disposed on one side in the axial direction relative to one end in the axial direction of the circuit board and protruding radially outward from a radially outer surface.

(6)
A motor, in which another end in an axial direction of the holding protrusion is positioned at substantially a same height in the axial direction as the one end in the axial direction of the stator accommodating portion.

(7)
A motor, in which a radially outer end of the holding protrusion is positioned radially outside relative to a peripheral edge of the board through hole.

(8)
A motor, in which
the holding protrusion includes:
a curved surface that is disposed at another end portion in the axial direction, is inclined to one side in the axial direction toward a radially outside, and is curved convexly toward the radially outside.

(9)
A motor, in which the holding protrusion has a plurality of grooves formed on a radially outer surface.

(10)
A blower including:
a motor;
an impeller that is fixed to the rotor and generates an airflow in an axial direction; and
a housing body portion that extends along the rotation axis, is formed in a tubular shape, has both end surfaces in the axial direction opened, and internally has a blowing flow path,
in which the motor and the impeller are accommodated inside the housing body portion.

FIGS. 1 and 2 are a perspective view and an exploded perspective view, respectively, of an example of the blower 1 according to the first example embodiment of the present disclosure. The blower 1 includes a motor 20, an impeller 30, and a housing 40.

The impeller 30 is fixed to the motor 20 and rotates about the rotation axis J to generate an airflow on the lower side Z1 in the axial direction (the other side in the axial direction) along the rotation axis J.

The housing 40 is formed in a tubular shape extending along the rotation axis J, and has a blowing flow path 41 in which both end surfaces in the axial direction are opened and an airflow internally circulates. The motor 20 and the impeller 30 are accommodated inside the housing 40. The housing 40 has an exhaust port 42 on a lower end surface (the other end surface in the axial direction) (see FIG. 3) and an intake port 43 on an upper end side (one end surface in the axial direction).

The housing 40 is configured by axially coupling an upper housing part 40*a* and a lower housing part 40*b*. The upper housing part 40*a* and the lower housing part 40*b* are resin molded articles. In the present example embodiment, the housing 40 can be divided into the upper housing part 40*a* and the lower housing part 40*b*, but the upper housing part 40*a* and the lower housing part 40*b* may be integrally formed. The upper housing part 40*a* includes an upper body portion 401*a*, a fixing part 402*a*, and coupling parts 403*a* and 403*b*. The upper body portion 401*a* extends in the axial direction and is formed in a tubular shape.

The fixing part 402*a* and the coupling parts 403*a* and 403*b* constitute a lid portion 27 that covers an opening 25*a* (see FIG. 4) of a stator accommodating portion 25 described below. The lid portion 27 is a part of the housing 40 and also a part of the motor 20. The fixing part 402*a* is arranged on an upper side Z2 in the axial direction (one side in the axial direction) of the stator accommodating portion 25 described below, and has a disk shape expanding in the radial direction about the rotation axis J. A stator 23 described below of the motor 20 is fixed to the fixing part 402*a*. That is, the fixing part 402*a* is formed in a plate shape to which the stator 23 is fixed.

The coupling parts 403*a* and 403*b* extend radially outward from the fixing part 402*a* and couple the fixing part 402*a* and a housing body portion 40*c*. A plurality of the coupling parts 403*a* are arranged in the circumferential direction and axially opposes an accommodating recess 252*a* described below. The coupling part 403*b* is disposed at one position in the circumferential direction and axially opposes a pullout piece 2522 described below. The air circulating through the blowing flow path 41 passes through between the adjacent coupling parts 403*a* and 403*b*.

The coupling part 403*a* is formed to be inclined to one side in the circumferential direction from the radially inner end toward the radially outside. Due to this, the airflow flowing into the housing 40 from the intake port 43 smoothly circulates along the coupling part 403*a*. Therefore, the blowing efficiency of the blower 1 can be further improved. The coupling part 403*a* may be formed to be inclined to the other side in the circumferential direction from the radially inner end toward the radially outside. The coupling part 403*a* may be formed to extend linearly in the radial direction. The coupling part 403*b* is formed to extend linearly in the radial direction.

The coupling part 403*a* has a coupling recess 405*a* (see FIG. 4). The coupling recess 405*a* is disposed to oppose the stator accommodating portion 25 in the axial direction, and is recessed to the one side in the axial direction from the lower end surface (end surface on the other side in the axial direction) of the coupling part 403*a*. This can prevent the stator accommodating portion 25 from coming into contact with the coupling part 403 when swung in the axial direction.

The lower housing part 40*b* has a lower body portion 401*b* that extends in the axial direction and is formed in a tubular shape. The lower body portion 401*b* and the upper body portion 401*a* are coupled in the axial direction to constitute the housing body portion 40*c*. That is, the blower 1 includes the housing body portion 40*c*, and the housing body portion 40*c* is formed in a tubular shape extending along the rotation axis J, and internally has the blowing flow path 41 with both end surfaces in the axial direction opened. The motor 20 and the impeller 30 are accommodated inside the housing body portion 40*c*.

The impeller 30 includes an impeller cup 31 and a plurality of blades 32. The impeller cup 31 is fixed to a radially outside of a rotor 24 described below of the motor 20. The plurality of blades 32 are arrayed in the circumferential direction on a radially outer surface of the impeller cup 31.

FIG. 3 is a longitudinal cross-sectional perspective view of the blower 1, and FIG. 4 is a longitudinal cross-sectional perspective view showing a part of the blower 1 in an enlarged manner. The motor 20 includes a shaft 21, a bearing 22, the stator 23, the rotor 24, the stator accommodating portion 25, a seal 26, the above-described lid portion 27, and a circuit board 28.

The shaft 21 extends along the rotation axis J. The shaft 21 is a columnar member that is made of metal such as stainless steel and extends in the axial direction.

The bearings 22 are arranged in a pair at least spaced apart in the axial direction. The bearing 22 is configured by, for example, a ball bearing, but may be configured by a sleeve bearing or the like. The pair of bearings 22 support the shaft 21 so as to be rotatable about the rotation axis J with respect to the stator 23.

The stator 23 opposes the rotor 24 with a gap interposed radially inward. The stator 23 includes a bearing holding portion 231, a stator core 232, an insulator 233, and a coil 234. The bearing holding portion 231 is formed in a cylindrical shape and internally holds the bearing 22.

An upper end portion (one end portion in the axial direction) of the bearing holding portion 231 is fitted via a connector 45 into a fitting hole 404*a* of the fixing part 402*a*. Due to this, the bearing holding portion 231 is fixed to the fixing part 402*a*, and the stator 23 and the housing 40 are fixed. The fitting hole 404*a* is formed to penetrate the fixing part 402*a* in the axial direction. The connector 45 is formed in an annular shape and is disposed on the inner peripheral surface of the fitting hole 404*a*. The bearing holding portion 231 is disposed on the inner peripheral surface of the connector 45. A lower end portion (the other end portion in the axial direction) of the bearing holding portion 231 is fixed to the stator accommodating portion 25 described below. The upper end portion (one end portion in the axial direction) of the bearing holding portion 231 may be directly fitted into the fitting hole 404*a* without the connector 45.

The stator core 232 is formed by vertically stacking electromagnetic steel plates such as silicon steel plates. The insulator 233 is made of an insulating resin. The stator core 232 includes an annular core back (not shown) and a plurality of teeth (not shown) protruding radially outward from the core back and arranged in the circumferential direction. The insulator 233 is provided on a part of the outer surface in the axial direction of the teeth and a part of the outer surface in the circumferential direction of the teeth. The insulator 233 is provided surrounding an outer surface of the stator core 232. The coil 234 is formed of a conductive wire wound around the stator core 232 via the insulator 233.

The rotor 24 rotates about the rotation axis J with respect to the stator 23. The rotor 24 includes a rotor yoke 241 and a magnet 242.

The rotor yoke 241 is a member in a substantially cylindrical shape made of a magnetic material and having a lid on portion (the other end portion in the axial direction) of the shaft 21. The magnet 242 has a cylindrical shape and is fixed to an inner peripheral surface of the rotor yoke 241. Due to this, the magnet 242 is disposed on the radially outside of the stator 23.

The circuit board 28 is in contact with the upper end (one end in the axial direction) of the insulator 233 and is disposed between the stator core 232 and the lid portion 27. The circuit board 28 has a disk shape expanding in the radial direction about the rotation axis J, for example. The circuit board 28 has a board through hole 28*a*. The board through hole 28*a* is disposed on the rotation axis J and penetrates in the axial direction. The upper end portion (one end portion in the axial direction) of the bearing holding portion 231 is inserted into the board through hole 28*a* and extends in the upper side Z2 in the axial direction (one side in the axial direction) relative to the circuit board 28.

A conductive wire (not shown) constituting the coil 234 is electrically connected to the circuit board 28. An electronic circuit for supplying a drive current to the coil 234 is mounted on the circuit board 28. The circuit board 28 is connected to a lead wire 50 (see FIGS. 6 and 7), and the lead wire 50 is pulled out to the outside of the stator accommodating portion 25 and connected to an external power source. The lead wire 50 is electrically connected to the coil 234, and the lead wire 50 and the stator 23 are electrically connected. In the present example embodiment, three lead wires 50 are pulled out to the outside of the stator accommodating portion 25.

FIGS. 5 and 6 are a perspective view and a top view, respectively, of the motor 20, and FIG. 7 is a longitudinal cross-sectional perspective view of the stator accommodating portion 25. In FIGS. 5 and 6, the rotor 24, the seal 26, and the lid portion 27 are not shown, and the elastic portion 29 is indicated by a dotted line. In FIG. 5, the lead wire 50 is not shown, and in FIGS. 6 and 7, the lead wire 50 is indicated by an alternate long and short dash line.

The stator accommodating portion 25 is formed in a tubular shape and has the opening 25a on one end surface in the axial direction (end surface on one side in the axial direction). The stator accommodating portion 25 internally accommodates the shaft 21, the bearing 22, the stator 23, and the circuit board 28. The stator accommodating portion 25 is filled with the seal 26 (see FIG. 4). Due to this, the shaft 21, the bearing 22, the stator 23, and the circuit board 28 are integrated, and the assembly workability of the motor 20 is improved.

The stator core 232 is press-fitted into the inner peripheral surface of the stator accommodating portion 25. At this time, the radially outer surfaces of the teeth (not shown) come into contact with the inner peripheral surface of the stator accommodating portion 25. The outer peripheral surface of the stator accommodating portion 25 opposes the magnet 242 in the radial direction with a gap interposed (see FIG. 3).

The seal 26 is formed of a curable insulating resin or the like, and for example, an epoxy resin, silicone rubber, a polyurethane resin, or the like is used. The liquid seal 26 is filled inside the stator accommodating portion 25 from the opening 25a and is cured after a predetermined time elapses. Due to this, the stator 23 and the circuit board 28 are covered with the cured seal 26, and waterproof property, oil proof property, and the like of the stator 23 and the circuit board 28 are improved.

The stator accommodating portion 25 includes a stator tube portion 251, a board tube portion 252, an intermediate tube portion 253, an accommodating lid portion 254, and an accommodating inclined portion 255.

The stator tube portion 251 surrounds the stator 23 from circuit board 28 from radially outside. The intermediate tube portion 253 couples the stator tube portion 251 and the board tube portion 252.

The accommodating lid portion 254 covers the stator 23 from the lower side Z1 in the axial direction (the other side in the axial direction) and expands in the radial direction. The accommodating lid portion 254 has an accommodating through hole 254a and an accommodating holding portion 254b penetrating in the axial direction. The lower end portion (the other end portion in the axial direction) of the bearing holding portion 231 is fitted into the accommodating through hole 254a (see FIG. 3). Due to this, the stator accommodating portion 25 is fixed to the bearing holding portion 231. The accommodating holding portion 254b protrudes in the upper side Z2 in the axial direction (one side in the axial direction) from the peripheral edge of the accommodating through hole 254a, and is formed in a tubular shape. The accommodating holding portion 254b holds the lower end portion (the other end portion in the axial direction) of the bearing holding portion 231.

The board tube portion 252 has the accommodating recess 252a. The accommodating recess 252a is arranged in the upper end portion (one end portion in the axial direction) of the stator accommodating portion 25 and is recessed radially outward from the radially inner surface. In the radial direction, a gap S is formed between the radially outer edge of the circuit board 28 and the accommodating recess 252a. In the present example embodiment, the accommodating recess 252a has a part of the board tube portion 252 formed in a convex shape radially outside, and is provided at three places at equal intervals in the circumferential direction. The number of accommodating recesses 252a is not limited to three. By providing the accommodating recess 252a, the seal 26 can smoothly flow into the stator accommodating portion 25 from the gap S. This improves the assembling workability of the blower 1.

As viewed from the axial direction, at least a part of the accommodating recess 252a overlaps the coupling part 403a of the lid portion 27 (see FIG. 4). In the present example embodiment, the circumferential width of the accommodating recess 252a is equal to or less than the circumferential width of the coupling part 403a, and the entire accommodating recess 252a overlaps the coupling part 403a as viewed from the axial direction. This can reduce the airflow that passes through between the adjacent coupling parts 403a and flows into the housing 40 from being disturbed in the vicinity of the accommodating recess 252a. Therefore, the blowing efficiency of the blower 1 can be improved.

The radial protrusion amount of the accommodating recess 252a is ½ or less of the radial size of the coupling part 403a. This can further reduce the airflow that passes through between the adjacent coupling parts 403a and flows into the housing 40 from being disturbed in the vicinity of the accommodating recess 252a. It is preferable that the radial protrusion amount of the accommodating recess 252a is smaller as long as a predetermined size of the gap S is secured.

The intermediate tube portion 253 is inclined radially inward toward the lower side Z1 in the axial direction (the other side in the axial direction). This allows the seal 26 to smoothly flow into the stator tube portion 251 from the board tube portion 252 along the intermediate tube portion 253.

The accommodating inclined portion 255 couples the stator tube portion 251 and the accommodating lid portion 254 and is inclined radially inward toward the lower side Z1 in the axial direction (the other side in the axial direction). This allows the seal 26 to smoothly flow into the radially inside of the along the accommodating inclined portion 255. The resin amount of the seal 26 can be reduced, and the manufacturing cost can be reduced.

The stator accommodating portion 25 has an accommodating projection 251a that protrudes from the radially inner surface and extends in the axial direction (see FIG. 7). In the present example embodiment, the accommodating projection 251a is disposed on the radially inner surface of the stator tube portion 251. The accommodating projection 251a is fitted into a groove (not shown) formed on the radially outer surface of the stator core 232 and extending in the axial direction. This enables easy positioning in the circumferential direction of the stator core 232 in the stator accommodating portion 25. In a state where the stator core 232 is accommodated in the stator accommodating portion 25, the accommodating projection 251a is press-fitted between teeth (not shown) adjacent in the circumferential direction.

The stator accommodating portion 25 further includes a cutout 2521 and the pullout piece 2522.

The cutout 2521 is recessed from the upper end (one end in the axial direction) of the stator accommodating portion 25 to the lower side Z1 in the axial direction (the other side in the axial direction), and the lead wire 50 is pulled out radially outward (see FIG. 7).

The pullout piece 2522 protrudes radially outward from the bottom of the cutout 2521, and is formed in a plate shape. The elastic portion 29 in a rectangular parallelepiped shape is disposed on the upper surface (end surface on one side in the axial direction) of the pullout piece 2522. The lead wire 50 is disposed on the upper surface (end surface on one side in the axial direction) of the elastic portion 29. The upper end (one end in the axial direction) of the elastic portion 29 is disposed on the upper side Z2 in the axial direction (one side in the axial direction) relative to the upper end (one end in the axial direction) of the board tube portion 252.

Due to this, even when flowing out to the outside of the cutout 2521, the seal 26 before being cured is dammed by the elastic portion 29. Therefore, the seal 26 before being cured can be prevented from flowing out of the stator accommodating portion 25 via the cutout 2521. At this time, the upper end (one end in the axial direction) of the elastic portion 29 is disposed on the upper side Z2 in the axial direction (one side in the axial direction) relative to the upper end (one end in the axial direction) of the cured seal 26.

The elastic portion 29 is fixed to the pullout piece 2522 via an adhesive layer 29*a* (see FIG. 7). This allows the elastic portion 29 to be easily fixed to the pullout piece 2522, and improves the assembling workability of the motor 20. The elastic portion 29 is made of, for example, a rubber portion.

By providing the pullout piece 2522, the lead wire 50 can be pulled out radially outward while being supported by the pullout piece 2522 without being largely bent in the axial direction. Therefore, damage to the lead wire 50 can be prevented.

The pullout piece 2522 includes a pullout inclined portion 2522*a*, a pullout projection 2522*b*, and a pair of pullout wall portions 2522*c*. The pullout inclined portion 2522*a* is inclined in the upper side Z2 in the axial direction (one side in the axial direction) toward radially outward from the bottom of the cutout 2521. By providing the pullout inclined portion 2522*a*, the seal 26 before being cured can be further prevented from flowing out to the outside of the stator accommodating portion 25 via the cutout 2521.

The pullout projection 2522*b* is disposed adjacent to the radially outside of the cutout 2521 and protrudes from the upper surface (end surface on one side in the axial direction) of the the elastic portion 29 can be easily positioned.

The pullout wall portion 2522*c* protrudes in the upper side Z2 in the axial direction (one side in the axial direction) from both end portions in the radial direction of the pullout piece 2522 and extends in the radial direction. The radially inner end of the pullout wall portion 2522*c* is coupled to the outer peripheral surface of the board tube portion 252. The upper end (one end in the axial direction) of the pullout wall portion 2522*c* is disposed in the upper side Z2 in the axial direction (one side in the axial direction) relative to the upper end (one end in the axial direction) of the board tube portion 252. Due to this, the seal 26 before being cured can be further prevented from flowing out to the outside of the stator accommodating portion 25 via the cutout 2521.

The pullout piece 2522 is arranged to oppose the coupling part 403*b* (lid portion 27) in the axial direction. At this time, the lead wire 50 is sandwiched between the coupling part 403*b* (lid portion 27) and the pullout piece 2522 via the elastic portion 29. At this time, the elastic portion 29 deforms along the outer peripheral surface of the lead wire 50, and a minute gap is hardly generated between the lead wire 50 and the elastic portion 29. This can prevent the seal 26 before being cured from passing through between the lead wire 50 and the elastic portion 29 due to a capillary phenomenon along the lead wire 50. Therefore, the seal 26 can be prevented from flowing out to the outside of the stator accommodating portion 25. This can provide the motor 20 that can prevent the seal 26 from flowing out.

FIG. 8 is a longitudinal cross-sectional view schematically showing a part of the motor 20. The upper end (one end in the axial direction) of the stator accommodating portion 25 is positioned in the lower side Z1 in the axial direction (the other side in the axial direction) relative to the lower end (the other side in the axial direction) of the lid portion 27 on the radially inside relative to the upper end (one end in the axial direction) of the stator accommodating portion 25.

There is a possibility that the seal 26 bulges and is cured in the upper side Z2 in the axial direction (one side in the axial direction) along the radially inner surface of the stator accommodating portion 25, and a fillet is formed at the radially outer end portion of the seal 26. The fillet does not bulge in the upper side Z2 of the axial direction (one side in the axial direction) beyond the upper end (one end in the axial direction) of the stator accommodating portion 25. Due to this, even when a fillet is formed along the radially inner surface of the stator accommodating portion 25, the upper end (one end in the axial direction) of the fillet is positioned in the lower side Z1 in the axial direction (the other side in the axial direction) relative to the lower end (the other end in the axial direction) of the lid portion 27. Therefore, the lid portion 27 covering the opening 25*a* and the seal 26 can be prevented from coming into contact with each other. This can downsize the motor 20 in the axial direction.

In the present example embodiment, the seal 26 is filled up to the upper end (one end in the axial direction) of the stator accommodating portion 25, and the upper end (one end in the axial direction) of the cured seal 26 is disposed at the same height in the axial direction as the upper side Z2 in the axial direction (one side in the axial direction) relative to the upper end (one end in the axial direction) of the stator accommodating portion 25 or the one end in the axial direction of the stator accommodating portion 25. At this time, at the radially outer end portion of the seal 26, a fillet is not formed along the radially inner surface of the stator accommodating portion 25. Therefore, it is possible to reduce variation, for each product, in the height of the upper end (end surface on one side in the axial direction) of the seal 26. This allows the lid portion 27 to be disposed close to the upper end (one end in the axial direction) of the stator accommodating portion 25 while preventing the lid portion 27 and the seal 26 from coming into contact with each other. Therefore, it is possible to further downsize the motor 20 in the axial direction.

The upper end surface (end surface on one side in the axial direction) of the seal 26 is formed orthogonal to the axial direction. This allows the lid portion 27 to be disposed closer to the upper end (one end in the axial direction) of the stator accommodating portion 25.

When the upper end (one end in the axial direction) of the cured seal 26 is disposed in the lower side Z1 in the axial direction (the other side in the axial direction) relative to the upper end (one end in the axial direction) of the stator accommodating portion 25, the upper end (one end in the axial direction) of the stator accommodating portion 25 can be disposed close to the lid portion 27. At this time, the coupling recess 405*a* is formed in the lower end surface (the end surface on the other side in the axial direction) of the coupling part 403*a*, and it is possible to prevent the upper end (one end in the axial direction) of the stator accommodating portion 25 and the lid portion 27 from coming into contact with each other.

The upper end (one end in the axial direction) of the bearing holding portion 231 extends to the upper side Z2 in the axial direction (one side in the axial direction) relative to the upper end (one end in the axial direction) of the stator accommodating portion 25 and is fixed to the lid portion 27. This allows the lid portion 27 and the stator accommodating portion 25 to be easily fixed with a small number of components via the bearing holding portion 231 in a state where the lid portion 27 and the upper end portion of the stator accommodating portion 25 filled with the seal 26 are not in contact with each other.

The bearing holding portion 231 has a holding protrusion 2311. The holding protrusion 2311 is disposed the upper side Z2 in the axial direction (one side in the axial direction) relative to the upper end (one end in the axial direction) of the circuit board 28. The holding protrusion 2311 protrudes radially outward from the radially outer surface and is formed in an annular shape. The lower end (the other end in the axial direction) of the holding protrusion 2311 is positioned at substantially the same height as the upper end (one end in the axial direction) of the stator accommodating portion 25 in the axial direction. The holding protrusion 2311 may be integrated with or separated from the bearing holding portion 231. When the holding protrusion 2311 is separated from the bearing holding portion 231, the holding protrusion 2311 is attached to the bearing holding portion 231 after the circuit board 28 is disposed on the upper end (one end in the axial direction) of the insulator 233. This improves assembly workability of the circuit board 28.

When the seal 26 is about to be cured bulging to the upper side Z2 in the axial direction (one side in the axial direction) along the radially outer surface of the bearing holding portion 231, the holding protrusion 2311 can suppress rise of the seal 26. This can prevent the lid portion 27 covering the opening 25a and the seal 26 from coming into contact with each other. By arranging the lower end (the other end in the axial direction) of the holding protrusion 2311 at substantially the same height as the upper end (one end in the axial direction) of the stator accommodating portion 25 in the axial direction, the upper end surface (the end surface on one side in the axial direction) of the seal 26 orthogonal to the axial direction can be easily formed when the seal 26 is filled up to the upper end (one end in the axial direction) of the stator accommodating portion 25.

The radially outer end of the holding protrusion 2311 is positioned radially outside relative to the peripheral edge of the board through hole 28a. Due to this, the holding protrusion 2311 further protrudes radially outward, and the rise of the seal 26 can be more reliably suppressed.

The holding protrusion 2311 has a curved surface 2312. The curved surface 2312 is disposed at the other end portion in the axial direction of the holding protrusion 2311, is inclined to the upper side Z2 in the axial direction (one side in the axial direction) toward the radially outside, and is curved convexly toward the radially outside. This allows the holding protrusion 2311 to more reliably suppress the rise of the seal 26.

A plurality of grooves 2311a are formed on the radially outer surface of the holding protrusion 2311. Forming the groove 2311a makes it difficult to form a fillet along the radially outer surface of the holding protrusion 2311 when the seal 26 is cured. Therefore, the holding protrusion 2311 can suppress rise of the seal 26 more reliably. The groove 2311a is formed by knurling, for example.

Next, the second example embodiment of the present disclosure will be described. FIG. 9 is a longitudinal cross-sectional view schematically showing a part of the motor 20. For the sake of convenience in description, the same reference numerals are given to the same parts as those of the first example embodiment shown in FIGS. 1 to 8. The second example embodiment is different from the first example embodiment in that an oil repellent layer 2313 is formed on a radially outer surface of the bearing holding portion 231 in place of the holding protrusion 2311. Other parts are the same as those in the first example embodiment.

The oil repellent layer 2313 is disposed in the upper side Z2 in the axial direction (one side in the axial direction) relative to the upper end (one end in the axial direction) of the circuit board 28. The oil repellent layer 2313 includes, for example, a fluororesin, and repels the seal 26.

Due to this, the seal 26 is repelled by the oil repellent layer 2313 when the seal 26 is about to be cured bulging to the upper side in the axial direction (one side in the axial direction) along the radially outer surface of the bearing holding portion 231. Therefore, the oil repellent layer 2313 can suppress rise of the seal 26. This can prevent the lid portion 27 covering the opening 25a and the seal 26 from coming into contact with each other.

The lower end (the other end in the axial direction) of the oil repellent layer 2313 is positioned at substantially the same height as the upper end (one end in the axial direction) of the stator accommodating portion 25 in the axial direction. Due to this, the upper end surface (the end surface on one side in the axial direction) of the seal 26 orthogonal to the axial direction can be easily formed when the seal 26 is filled up to the upper end (one end in the axial direction) of the stator accommodating portion 25. While the oil repellent layer 2313 is formed on the radially outer surface of the bearing holding portion 231 in the present example embodiment, the oil repellent layer 2313 may be formed on the radially outer surface of the holding protrusion 2311 of the first example embodiment.

Next, the third example embodiment of the present disclosure will be described. FIG. 10 is a longitudinal cross-sectional view schematically showing a part of the motor 20. For the sake of convenience in description, the same reference numerals are given to the same parts as those of the first example embodiment shown in FIGS. 1 to 8. The third example embodiment is different from the first example embodiment in the position of the holding protrusion 2311. Other parts are the same as those in the first example embodiment.

The upper end (one end in the axial direction) of the holding protrusion 2311 is positioned at substantially the same height as one end in the axial direction of the stator accommodating portion 25 in the axial direction. When the seal 26 is filled up to the upper end (one end in the axial direction) of the stator accommodating portion 25, the seal 26 is hardly cured bulging to the upper side Z2 in the axial direction (one side in the axial direction) along the radially outer surface of the bearing holding portion 231 from the upper end of the holding protrusion 2311. Therefore, at the radially inner end portion of the seal 26, a fillet is not formed along the radially outer surface of the bearing holding portion 231 beyond the holding protrusion 2311. Therefore, it is possible to reduce variation, for each product, in the height of the upper end (end surface on one side in the axial direction) of the seal 26.

The holding protrusion 2311 may be integrated with or separated from the bearing holding portion 231. When the holding protrusion 2311 is separated from the bearing holding portion 231, the holding protrusion 2311 is attached to the bearing holding portion 231 after the circuit board 28 is disposed on the upper end (one end in the axial direction) of the insulator 233. This improves assembly workability of the circuit board 28.

The example embodiments of the present disclosure have been described above. The scope of the present disclosure is not limited to the above-described example embodiments. The present disclosure can be implemented with various modifications within a scope not departing from the gist of the disclosure. The above-described example embodiments can be appropriately and optionally combined. For example, the oil repellent layer 2313 may be formed in which the groove 2311*a* of the first example embodiment is formed.

Hereinafter, exemplary example embodiments of a third aspect of the present disclosure will be described in detail with reference to the drawings.

(1)
A motor including:
a rotor that rotates about a rotation axis;
a stator that opposes the rotor with a gap interposed radially inward;
a circuit board connected to the stator and disposed on one side in an axial direction of the stator;
a stator accommodating portion in a tubular shape that accommodates the stator and the circuit board and has an opening on one end surface in the axial direction;
a seal filled in the stator accommodating portion; and
a lid portion that covers the opening,
in which the stator includes
a bearing holding portion in a tubular shape that internally holds a bearing that rotatably supports a shaft extending along the rotation axis,
the circuit board has a board through hole that is disposed on the rotation axis and penetrates the circuit board in the axial direction,
one end portion in the axial direction of the bearing holding portion is inserted into the board through hole and extends to one side in the axial direction relative to the circuit board, and
the bearing holding portion includes
an oil repellent layer formed on a radially outer surface on one side in the axial direction relative to one end in the axial direction of the circuit board.

(2)
A motor, in which another end in the axial direction of the oil repellent layer is positioned at substantially a same height in the axial direction as the one end in the axial direction of the stator accommodating portion.

(3)
A motor, in which the oil repellent layer includes a fluororesin.

(4)
A motor including:
a rotor that rotates about a rotation axis;
a stator that opposes the rotor with a gap interposed radially inward;
a circuit board connected to the stator and disposed on one side in an axial direction of the stator;
a stator accommodating portion in a tubular shape that accommodates the stator and the circuit board and has an opening on one end surface in the axial direction;
a seal filled in the stator accommodating portion; and
a lid portion that covers the opening,
in which the stator includes
a bearing holding portion in a tubular shape that internally holds a bearing that rotatably supports a shaft extending along the rotation axis,
the circuit board has a board through hole that is disposed on the rotation axis and penetrates the circuit board in the axial direction,
one end portion in the axial direction of the bearing holding portion is inserted into the board through hole and extends to one side in the axial direction relative to the circuit board, and
the bearing holding portion includes
a holding protrusion in an annular shape disposed on one side in the axial direction relative to one end in the axial direction of the circuit board and protruding radially outward from a radially outer surface.

(5)
A motor, in which one end in the axial direction of the holding protrusion is positioned at substantially a same height in the axial direction as the one end in the axial direction of the stator accommodating portion.

(6)
A motor, in which a radially outer end of the holding protrusion is positioned radially outside relative to a peripheral edge of the board through hole.

(7)
A motor, in which
the holding protrusion includes:
a curved surface that is disposed at another end portion in the axial direction, is inclined to one side in the axial direction toward a radially outside, and is curved convexly toward the radially outside.

(8)
A motor, in which the holding protrusion has a plurality of grooves formed on a radially outer surface.

(9)
A blower including:
a motor;
an impeller that is fixed to the rotor and generates an airflow in an axial direction; and
a housing body portion that extends along the rotation axis, is formed in a tubular shape, has both end surfaces in the axial direction opened, and internally has a blowing flow path,
in which the motor and the impeller are accommodated inside the housing body portion.

FIGS. 1 and 2 are a perspective view and an exploded perspective view, respectively, of an example of the blower 1 according to the first example embodiment of the present disclosure. The blower 1 includes a motor 20, an impeller 30, and a housing 40.

The impeller 30 is fixed to the motor 20 and rotates about the rotation axis J to generate an airflow on the lower side X1 in the axial direction (the other side in the axial direction) along the rotation axis J.

The housing 40 is formed in a tubular shape extending along the rotation axis J, and has a blowing flow path 41 in which both end surfaces in the axial direction are opened and an airflow internally circulates. The motor 20 and the impeller 30 are accommodated inside the housing 40. The housing 40 has an exhaust port 42 on a lower end surface (the other end surface in the axial direction) (see FIG. 3) and an intake port 43 on an upper end side (one end surface in the axial direction).

The housing 40 is configured by axially coupling an upper housing part 40*a* and a lower housing part 40*b*. The upper housing part 40*a* and the lower housing part 40*b* are resin molded articles. In the present example embodiment, the housing 40 can be divided into the upper housing part 40*a* and the lower housing part 40*b*, but the upper housing part 40*a* and the lower housing part 40*b* may be integrally formed. The upper housing part 40*a* includes an upper body portion 401*a*, a fixing part 402*a*, and coupling parts 403*a* and 403*b*. The upper body portion 401*a* extends in the axial direction and is formed in a tubular shape.

The fixing part 402*a* and the coupling parts 403*a* and 403*b* constitute a lid portion 27 that covers an opening 25*a* (see FIG. 4) of a stator accommodating portion 25 described below. The lid portion 27 is a part of the housing 40 and also a part of the motor 20. The fixing part 402*a* is arranged on an upper side X2 in the axial direction (one side in the axial direction) of the stator accommodating portion 25 described below, and has a disk shape expanding in the radial direction about the rotation axis J. A stator 23 described below of the motor 20 is fixed to the fixing part 402*a*. That is, the fixing part 402*a* is formed in a plate shape to which the stator 23 is fixed.

The coupling parts 403*a* and 403*b* extend radially outward from the fixing part 402*a* and couple the fixing part 402*a* and a housing body portion 40*c*. A plurality of the coupling parts 403*a* are arranged in the circumferential direction and axially opposes an accommodating recess 252*a* described below. The coupling part 403*b* is disposed at one position in the circumferential direction and axially opposes a pullout piece 2522 described below. The air circulating through the blowing flow path 41 passes through between the adjacent coupling parts 403*a* and 403*b*.

The coupling part 403*a* is formed to be inclined to one side in the circumferential direction from the radially inner end toward the radially outside. Due to this, the airflow flowing into the housing 40 from the intake port 43 smoothly circulates along the coupling part 403*a*. Therefore, the blowing efficiency of the blower 1 can be further improved. The coupling part 403*a* may be formed to be inclined to the other side in the circumferential direction from the radially inner end toward the radially outside. The coupling part 403*a* may be formed to extend linearly in the radial direction. The coupling part 403*b* is formed to extend linearly in the radial direction.

The coupling part 403*a* has a coupling recess 405*a* (see FIG. 4). The coupling recess 405*a* is disposed to oppose the stator accommodating portion 25 in the axial direction, and is recessed to the one side in the axial direction from the lower end surface (end surface on the other side in the axial direction) of the coupling part 403*a*. This can prevent the stator accommodating portion 25 from coming into contact with the coupling part 403 when swung in the axial direction.

The lower housing part 40*b* has a lower body portion 401*b* that extends in the axial direction and is formed in a tubular shape. The lower body portion 401*b* and the upper body portion 401*a* are coupled in the axial direction to constitute the housing body portion 40*c*. That is, the blower 1 includes the housing body portion 40*c*, and the housing body portion 40*c* is formed in a tubular shape extending along the rotation axis J, and internally has the blowing flow path 41 with both end surfaces in the axial direction opened. The motor 20 and the impeller 30 are accommodated inside the housing body portion 40*c*.

The impeller 30 includes an impeller cup 31 and a plurality of blades 32. The impeller cup 31 is fixed to a radially outside of a rotor 24 described below of the motor 20. The plurality of blades 32 are arrayed in the circumferential direction on a radially outer surface of the impeller cup 31.

FIG. 3 is a longitudinal cross-sectional perspective view of the blower 1, and FIG. 4 is a longitudinal cross-sectional perspective view showing a part of the blower 1 in an enlarged manner. The motor 20 includes a shaft 21, a bearing 22, the stator 23, the rotor 24, the stator accommodating portion 25, a seal 26, the above-described lid portion 27, and a circuit board 28.

The shaft 21 extends along the rotation axis J. The shaft 21 is a columnar member that is made of metal such as stainless steel and extends in the axial direction.

The bearings 22 are arranged in a pair at least spaced apart in the axial direction. The bearing 22 is configured by, for example, a ball bearing, but may be configured by a sleeve bearing or the like. The pair of bearings 22 support the shaft 21 so as to be rotatable about the rotation axis J with respect to the stator 23.

The stator 23 opposes the rotor 24 with a gap interposed radially inward. The stator 23 includes a bearing holding portion 231, a stator core 232, an insulator 233, and a coil 234. The bearing holding portion 231 is formed in a cylindrical shape and internally holds the bearing 22.

An upper end portion (one end portion in the axial direction) of the bearing holding portion 231 is fitted via a connector 45 into a fitting hole 404*a* of the fixing part 402*a*. Due to this, the bearing holding portion 231 is fixed to the fixing part 402*a*, and the stator 23 and the housing 40 are fixed. The fitting hole 404*a* is formed to penetrate the fixing part 402*a* in the axial direction. The connector 45 is formed in an annular shape and is disposed on the inner peripheral surface of the fitting hole 404*a*. The bearing holding portion 231 is disposed on the inner peripheral surface of the connector 45. A lower end portion (the other end portion in the axial direction) of the bearing holding portion 231 is fixed to the stator accommodating portion 25 described below. The upper end portion (one end portion in the axial direction) of the bearing holding portion 231 may be directly fitted into the fitting hole 404*a* without the connector 45.

The stator core 232 is formed by vertically stacking electromagnetic steel plates such as silicon steel plates. The insulator 233 is made of an insulating resin. The stator core 232 includes an annular core back (not shown) and a plurality of teeth (not shown) protruding radially outward from the core back and arranged in the circumferential direction. The insulator 233 is provided on a part of the outer surface in the axial direction of the teeth and a part of the outer surface in the circumferential direction of the teeth. The insulator 233 is provided surrounding an outer surface of the stator core 232. The coil 234 is formed of a conductive wire wound around the stator core 232 via the insulator 233.

The rotor 24 rotates about the rotation axis J with respect to the stator 23. The rotor 24 includes a rotor yoke 241 and a magnet 242.

The rotor yoke 241 is a member in a substantially cylindrical shape made of a magnetic material and having a lid on the axially inside. The rotor yoke 241 is fixed to the lower end portion (the other end portion in the axial direction) of the shaft 21. The magnet 242 has a cylindrical shape and is fixed to an inner peripheral surface of the rotor yoke 241. Due to this, the magnet 242 is disposed on the radially outside of the stator 23.

The circuit board 28 is in contact with the upper end (one end in the axial direction) of the insulator 233 and is disposed between the stator core 232 and the lid portion 27. The circuit board 28 has a disk shape expanding in the radial direction about the rotation axis J, for example. The circuit board 28 has a board through hole 28*a*. The board through hole 28*a* is disposed on the rotation axis J and penetrates in the axial direction. The upper end portion (one end portion in the axial direction) of the bearing holding portion 231 is inserted into the board through hole 28*a* and extends in the upper side X2 in the axial direction (one side in the axial direction) relative to the circuit board 28.

A conductive wire (not shown) constituting the coil 234 is electrically connected to the circuit board 28. An electronic circuit for supplying a drive current to the coil 234 is mounted on the circuit board 28. The circuit board 28 is connected to a lead wire 50 (see FIGS. 6 and 7), and the lead wire 50 is pulled out to the outside of the stator accommodating portion 25 and connected to an external power source. The lead wire 50 is electrically connected to the coil 234, and the lead wire 50 and the stator 23 are electrically connected. In the present example embodiment, three lead wires 50 are pulled out to the outside of the stator accommodating portion 25.

FIGS. 5 and 6 are a perspective view and a top view, respectively, of the motor 20, and FIG. 7 is a longitudinal cross-sectional perspective view of the stator accommodating portion 25. In FIGS. 5 and 6, the rotor 24, the seal 26, and the lid portion 27 are not shown, and the elastic portion 29 is indicated by a dotted line. In FIG. 5, the lead wire 50 is not shown, and in FIGS. 6 and 7, the lead wire 50 is indicated by an alternate long and short dash line.

The stator accommodating portion 25 is formed in a tubular shape and has the opening 25a on one end surface in the axial direction (end surface on one side in the axial direction). The stator accommodating portion 25 internally accommodates the shaft 21, the bearing 22, the stator 23, and the circuit board 28. The stator accommodating portion 25 is filled with the seal 26 (see FIG. 4). Due to this, the shaft 21, the bearing 22, the stator 23, and the circuit board 28 are integrated, and the assembly workability of the motor 20 is improved.

The stator core 232 is press-fitted into the inner peripheral surface of the stator accommodating portion 25. At this time, the radially outer surfaces of the teeth (not shown) come into contact with the inner peripheral surface of the stator accommodating portion 25. The outer peripheral surface of the stator accommodating portion 25 opposes the magnet 242 in the radial direction with a gap interposed (see FIG. 3).

The seal 26 is formed of a curable insulating resin or the like, and for example, an epoxy resin, silicone rubber, a polyurethane resin, or the like is used. The liquid seal 26 is filled inside the stator accommodating portion 25 from the opening 25a and is cured after a predetermined time elapses. Due to this, the stator 23 and the circuit board 28 are covered with the cured seal 26, and waterproof property, oil proof property, and the like of the stator 23 and the circuit board 28 are improved.

The stator accommodating portion 25 includes a stator tube portion 251, a board tube portion 252, an intermediate tube portion 253, an accommodating lid portion 254, and an accommodating inclined portion 255.

The stator tube portion 251 surrounds the stator 23 from the radially outside. The board tube portion 252 surrounds the circuit board 28 from radially outside. The intermediate tube portion 253 couples the stator tube portion 251 and the board tube portion 252.

The accommodating lid portion 254 covers the stator 23 from the lower side X1 in the axial direction (the other side in the axial direction) and expands in the radial direction. The accommodating lid portion 254 has an accommodating through hole 254a and an accommodating holding portion 254b penetrating in the axial direction. The lower end portion (the other end portion in the axial direction) of the bearing holding portion 231 is fitted into the accommodating through hole 254a (see FIG. 3). Due to this, the stator accommodating portion 25 is fixed to the bearing holding portion 231. The accommodating holding portion 254b protrudes in the upper side X2 in the axial direction (one side in the axial direction) from the peripheral edge of the accommodating through hole 254a, and is formed in a tubular shape. The accommodating holding portion 254b holds the lower end portion (the other end portion in the axial direction) of the bearing holding portion 231.

The board tube portion 252 has the accommodating recess 252a. The accommodating recess 252a is arranged in the upper end portion (one end portion in the axial direction) of the stator accommodating portion 25 and is recessed radially outward from the radially inner surface. In the radial direction, a gap S is formed between the radially outer edge of the circuit board 28 and the accommodating recess 252a. In the present example embodiment, the accommodating recess 252a has a part of the board tube portion 252 formed in a convex shape radially outside, and is provided at three places at equal intervals in the circumferential direction. The number of accommodating recesses 252a is not limited to three. By providing the accommodating recess 252a, the seal 26 can smoothly flow into the stator accommodating portion 25 from the gap S. This improves the assembling workability of the blower 1.

As viewed from the axial direction, at least a part of the accommodating recess 252a overlaps the coupling part 403a of the lid portion 27 (see FIG. 4). In the present example embodiment, the circumferential width of the accommodating recess 252a is equal to or less than the circumferential width of the coupling part 403a, and the entire accommodating recess 252a overlaps the coupling part 403a as viewed from the axial direction. This can reduce the airflow that passes through between the adjacent coupling parts 403a and flows into the housing 40 from being disturbed in the vicinity of the accommodating recess 252a. Therefore, the blowing efficiency of the blower 1 can be improved.

The radial protrusion amount of the accommodating recess 252a is ½ or less of the radial size of the coupling part 403a. This can further reduce the airflow that passes through between the adjacent coupling parts 403a and flows into the housing 40 from being disturbed in the vicinity of the accommodating recess 252a. It is preferable that the radial protrusion amount of the accommodating recess 252a is smaller as long as a predetermined size of the gap S is secured.

The intermediate tube portion 253 is inclined radially inward toward the lower side X1 in the axial direction (the other side in the axial direction). This allows the seal 26 to smoothly flow into the stator tube portion 251 from the board tube portion 252 along the intermediate tube portion 253. The resin amount of the seal 26 can be reduced, and the manufacturing cost can be reduced.

The accommodating inclined portion 255 couples the stator tube portion 251 and the accommodating lid portion 254 and is inclined radially inward toward the lower side X1 in the axial direction (the other side in the axial direction). This allows the seal 26 to smoothly flow into the radially inside of the accommodating lid portion 254 from the stator tube portion 251 along the accommodating inclined portion 255.

The stator accommodating portion 25 has an accommodating projection 251a that protrudes from the radially inner surface and extends in the axial direction (see FIG. 7). In the present example embodiment, the accommodating projection 251a is disposed on the radially inner surface of the stator tube portion 251. The accommodating projection 251a is fitted into a groove (not shown) formed on the radially outer surface of the stator core 232 and extending in the axial direction. This enables easy positioning in the circumferential direction of the stator core 232 in the stator accommodating portion 25. In a state where the stator core 232 is accommodated in the stator accommodating portion 25, the accommodating projection 251a is press-fitted between teeth (not shown) adjacent in the circumferential direction.

The stator accommodating portion 25 further includes a cutout 2521 and the pullout piece 2522.

The cutout 2521 is recessed from the upper end (one end in the axial direction) of the stator accommodating portion 25 to the lower side X1 in the axial direction (the other side in the axial direction), and the lead wire 50 is pulled out radially outward (see FIG. 7).

The pullout piece 2522 protrudes radially outward from the bottom of the cutout 2521, and is formed in a plate shape. The elastic portion 29 in a rectangular parallelepiped shape is disposed on the upper surface (end surface on one side in the axial direction) of the pullout piece 2522. The lead wire 50 is disposed on the upper surface (end surface on one side in the axial direction) of the elastic portion 29. The upper end (one end in the axial direction) of the elastic portion 29 is disposed on the upper side X2 in the axial direction (one side in the axial direction) relative to the upper end (one end in the axial direction) of the board tube portion 252.

Due to this, even when flowing out to the outside of the cutout 2521, the seal 26 before being cured is dammed by the elastic portion 29. Therefore, the seal 26 before being cured can be prevented from flowing out of the stator accommodating portion 25 via the cutout 2521. At this time, the upper end (one end in the axial direction) of the elastic portion 29 is disposed on the upper side X2 in the axial direction (one side in the axial direction) relative to the upper end (one end in the axial direction) of the cured seal 26.

The elastic portion 29 is fixed to the pullout piece 2522 via an adhesive layer 29a (see FIG. 7). This allows the elastic portion 29 to be easily fixed to the pullout piece 2522, and improves the assembling workability of the motor 20. The elastic portion 29 is made of, for example, a rubber portion.

By providing the pullout piece 2522, the lead wire 50 can be pulled out radially outward while being supported by the pullout piece 2522 without being largely bent in the axial direction. Therefore, damage to the lead wire 50 can be prevented.

The pullout piece 2522 includes a pullout inclined portion 2522a, a pullout projection 2522b, and a pair of pullout wall portions 2522c. The pullout inclined portion 2522a is inclined in the upper side X2 in the axial direction (one side in the axial direction) toward radially outward from the bottom of the cutout 2521. By providing the pullout inclined portion 2522a, the seal 26 before being cured can be further prevented from flowing out to the outside of the stator accommodating portion 25 via the cutout 2521.

The pullout projection 2522b is disposed adjacent to the radially outside of the cutout 2521 and protrudes from the upper surface (end surface on one side in the axial direction) of the pullout piece 2522. By providing the pullout projection 2522b, the elastic portion 29 can be easily positioned.

The pullout wall portion 2522c protrudes in the upper side X2 in the axial direction (one side in the axial direction) from both end portions in the radial direction of the pullout piece 2522 and extends in the radial direction. The radially inner end of the pullout wall portion 2522c is coupled to the outer peripheral surface of the board tube portion 252. The upper end (one end in the axial direction) of the pullout wall portion 2522c is disposed in the upper side X2 in the axial direction (one side in the axial direction) relative to the upper end (one end in the axial direction) of the board tube portion 252. Due to this, the seal 26 before being cured can be further prevented from flowing out to the outside of the stator accommodating portion 25 via the cutout 2521.

The pullout piece 2522 is arranged to oppose the coupling part 403b (lid portion 27) in the axial direction. At this time, the lead wire 50 is sandwiched between the coupling part 403b (lid portion 27) and the pullout piece 2522 via the elastic portion 29. At this time, the elastic portion 29 deforms along the outer peripheral surface of the lead wire 50, and a minute gap is hardly generated between the lead wire 50 and the elastic portion 29. This can prevent the seal 26 before being cured from passing through between the lead wire 50 and the elastic portion 29 due to a capillary phenomenon along the lead wire 50. Therefore, the seal 26 can be prevented from flowing out to the outside of the stator accommodating portion 25. This can provide the motor 20 that can prevent the seal 26 from flowing out.

FIG. 8 is a longitudinal cross-sectional view schematically showing a part of the motor 20. The upper end (one end in the axial direction) of the stator accommodating portion 25 is positioned in the lower side X1 in the axial direction (the other side in the axial direction) relative to the lower end (the other end in the axial direction) of the lid portion 27 on the radially inside relative to the upper end (one end in the axial direction) of the stator accommodating portion 25.

There is a possibility that the seal 26 bulges and is cured in the upper side X2 in the axial direction (one side in the axial direction) along the radially inner surface of the stator accommodating portion 25, and a fillet is formed at the radially outer end portion of the seal 26. The fillet does not bulge in the upper side X2 of the axial direction (one side in the axial direction) beyond the upper end (one end in the axial direction) of the stator accommodating portion 25. Due to this, even when a fillet is formed along the radially inner surface of the stator accommodating portion 25, the upper end (one end in the axial direction) of the fillet is positioned in the lower side X1 in the axial direction (the other side in the axial direction) relative to the lower end (the other end in the axial direction) of the lid portion 27. Therefore, the lid portion 27 covering the opening 25a and the seal 26 can be prevented from coming into contact with each other. This can downsize the motor 20 in the axial direction.

In the present example embodiment, the seal 26 is filled up to the upper end (one end in the axial direction) of the stator accommodating portion 25, and the upper end (one end in the axial direction) of the cured seal 26 is disposed at the same height in the axial direction as the upper side X2 in the axial direction (one side in the axial direction) relative to the upper end (one end in the axial direction) of the stator accommodating portion 25 or the one end in the axial direction of the stator accommodating portion 25. At this time, at the radially outer end portion of the seal 26, a fillet is not formed along the radially inner surface of the stator accommodating portion 25. Therefore, it is possible to reduce variation, for each product, in the height of the upper end (end surface on one side in the axial direction) of the seal 26. This allows the lid portion 27 to be disposed close to the upper end (one end in the axial direction) of the stator accommodating portion 25 while preventing the lid portion 27 and the seal 26 from coming into contact with each other. Therefore, it is possible to further downsize the motor 20 in the axial direction.

The upper end surface (end surface on one side in the axial direction) of the seal 26 is formed orthogonal to the axial direction. This allows the lid portion 27 to be disposed closer to the upper end (one end in the axial direction) of the stator accommodating portion 25.

When the upper end (one end in the axial direction) of the cured seal 26 is disposed in the lower side X1 in the axial direction (the other side in the axial direction) relative to the upper end (one end in the axial direction) of the stator accommodating portion 25, the upper end (one end in the axial direction) of the stator accommodating portion 25 can be disposed close to the lid portion 27. At this time, the coupling recess 405a is formed in the lower end surface (the end surface on the other side in the axial direction) of the coupling part 403a, and it is possible to prevent the upper end (one end in the axial direction) of the stator accommodating portion 25 and the lid portion 27 from coming into contact with each other.

The upper end (one end in the axial direction) of the bearing holding portion 231 extends to the upper side X2 in the axial direction (one side in the axial direction) relative to the upper end (one end in the axial direction) of the stator accommodating portion 25 and is fixed to the lid portion 27. This allows the lid portion 27 and the stator accommodating portion 25 to be easily fixed with a small number of components via the bearing holding portion 231 in a state where the lid portion 27 and the upper end portion of the stator accommodating portion 25 filled with the seal 26 are not in contact with each other.

The bearing holding portion 231 has a holding protrusion 2311. The holding protrusion 2311 is disposed the upper side X2 in the axial direction (one side in the axial direction) relative to the upper end (one end in the axial direction) of the circuit board 28. The holding protrusion 2311 protrudes radially outward from the radially outer surface and is formed in an annular shape. The lower end (the other end in the axial direction) of the holding protrusion 2311 is positioned at substantially the same height as the upper end (one end in the axial direction) of the stator accommodating portion 25 in the axial direction. The holding protrusion 2311 may be integrated with or separated from the bearing holding portion 231. When the holding protrusion 2311 is separated from the bearing holding portion 231, the holding protrusion 2311 is attached to the bearing holding portion 231 after the circuit board 28 is disposed on the upper end (one end in the axial direction) of the insulator 233. This improves assembly workability of the circuit board 28.

When the seal 26 is about to be cured bulging to the upper side X2 in the axial direction (one side in the axial direction) along the radially outer surface of the bearing holding portion 231, the holding protrusion 2311 can suppress rise of the seal 26. This can prevent the lid portion 27 covering the opening 25a and the seal 26 from coming into contact with each other. By arranging the lower end (the other end in the axial direction) of the holding protrusion 2311 at substantially the same height as the upper end (one end in the axial direction) of the stator accommodating portion 25 in the axial direction, the upper end surface (the end surface on one side in the axial direction) of the seal 26 orthogonal to the axial direction can be easily formed when the seal 26 is filled up to the upper end (one end in the axial direction) of the stator accommodating portion 25.

The radially outer end of the holding protrusion 2311 is positioned radially outside relative to the peripheral edge of the board through hole 28a. Due to this, the holding protrusion 2311 further protrudes radially outward, and the rise of the seal 26 can be more reliably suppressed.

The holding protrusion 2311 has a curved surface 2312. The curved surface 2312 is disposed at the other end portion in the axial direction of the holding protrusion 2311, is inclined to the upper side X2 in the axial direction (one side in the axial direction) toward the radially outside, and is curved convexly toward the radially outside. This allows the holding protrusion 2311 to more reliably suppress the rise of the seal 26.

A plurality of grooves 2311a are formed on the radially outer surface of the holding protrusion 2311. Forming the groove 2311a makes it difficult to form a fillet along the radially outer surface of the holding protrusion 2311 when the seal 26 is cured. Therefore, the holding protrusion 2311 can suppress rise of the seal 26 more reliably. The groove 2311a is formed by knurling, for example.

Next, the second example embodiment of the present disclosure will be described. FIG. 9 is a longitudinal cross-sectional view schematically showing a part of the motor 20. For the sake of convenience in description, the same reference numerals are given to the same parts as those of the first example embodiment shown in FIGS. 1 to 8. The second example embodiment is different from the first example embodiment in that an oil repellent layer 2313 is formed on a radially outer surface of the bearing holding portion 231 in place of the holding protrusion 2311. Other parts are the same as those in the first example embodiment.

The oil repellent layer 2313 is disposed in the upper side X2 in the axial direction (one side in the axial direction) relative to the upper end (one end in the axial direction) of the circuit board 28. The oil repellent layer 2313 includes, for example, a fluororesin, and repels the seal 26.

Due to this, the seal 26 is repelled by the oil repellent layer 2313 when the seal 26 is about to be cured bulging to the upper side in the axial direction (one side in the axial direction) along the radially outer surface of the bearing holding portion 231. Therefore, the oil repellent layer 2313 can suppress rise of the seal 26. This can prevent the lid portion 27 covering the opening 25a and the seal 26 from coming into contact with each other.

The lower end (the other end in the axial direction) of the oil repellent layer 2313 is positioned at substantially the same height as the upper end (one end in the axial direction) of the stator accommodating portion 25 in the axial direction. Due to this, the upper end surface (the end surface on one side in the axial direction) of the seal 26 orthogonal to the axial direction can be easily formed when the seal 26 is filled up to the upper end (one end in the axial direction) of the stator accommodating portion 25. While the oil repellent layer 2313 is formed on the radially outer surface of the bearing holding portion 231 in the present example embodiment, the oil repellent layer 2313 may be formed on the radially outer surface of the holding protrusion 2311 of the first example embodiment.

Next, the third example embodiment of the present disclosure will be described. FIG. 10 is a longitudinal cross-sectional view schematically showing a part of the motor 20. For the sake of convenience in description, the same reference numerals are given to the same parts as those of the first example embodiment shown in FIGS. 1 to 8. The third example embodiment is different from the first example embodiment in the position of the holding protrusion 2311. Other parts are the same as those in the first example embodiment.

The upper end (one end in the axial direction) of the holding protrusion 2311 is positioned at substantially the same height as one end in the axial direction of the stator accommodating portion 25 in the axial direction. When the seal 26 is filled up to the upper end (one end in the axial direction) of the stator accommodating portion 25, the seal 26 is hardly cured bulging to the upper side X2 in the axial direction (one side in the axial direction) along the radially outer surface of the bearing holding portion 231 from the upper end of the holding protrusion 2311. Therefore, at the radially inner end portion of the seal 26, a fillet is not formed along the radially outer surface of the bearing holding portion 231 beyond the holding protrusion 2311. Therefore, it is possible to reduce variation, for each product, in the height of the upper end (end surface on one side in the axial direction) of the seal 26.

The holding protrusion 2311 may be integrated with or separated from the bearing holding portion 231. When the holding protrusion 2311 is separated from the bearing holding portion 231, the holding protrusion 2311 is attached to the bearing holding portion 231 after the circuit board 28 is disposed on the upper end (one end in the axial direction) of the insulator 233. This improves assembly workability of the circuit board 28.

The example embodiments of the present disclosure have been described above. The scope of the present disclosure is not limited to the above-described example embodiments. The present disclosure can be implemented with various modifications within a scope not departing from the gist of the disclosure. The above-described example embodiments can be appropriately and optionally combined. For example, the oil repellent layer 2313 may be formed on the radially outer surface of the bearing holding portion 231 in which the groove 2311a of the first example embodiment is formed.

Hereinafter, exemplary example embodiments of a fourth aspect of the present disclosure will be described in detail with reference to the drawings.

(1)
A blower including:
a rotor that rotates about a rotation axis;
a stator that opposes the rotor with a gap interposed radially inward;
a circuit board connected to the stator and disposed on one side in an axial direction of the stator;
a stator accommodating portion in a tubular shape that accommodates the stator and the circuit board and has an opening on one end surface in the axial direction;
a seal filled in the stator accommodating portion;
a lid portion that covers the opening;
an impeller that is fixed to the rotor and generates an airflow in the axial direction; and
a housing body portion that is formed in a tubular shape extending along the rotation axis, has both end surfaces in the axial direction opened, and accommodates the stator accommodating portion and the impeller,
the stator accommodating portion includes
an accommodating recess disposed in one end portion in the axial direction and recessed radially outward from a radially inner surface, and
a gap is formed between a radially outer edge of the circuit board and the accommodating recess in a radial direction.

(2)
The stator accommodating portion includes
a stator tube portion that surrounds the stator from radially outside,
a board tube portion that surrounds the circuit board from radially outside, and
an intermediate tube portion that couples the stator tube portion and the board tube portion,
the accommodating recess has a part of the board tube portion formed in a convex shape radially outside,
the lid portion includes
a fixing part in a plate shape that is disposed to oppose the opening in the axial direction and to which the stator is fixed, and
a plurality of coupling parts extending radially outward from the fixing part, arranged in a circumferential direction, and coupling the fixing part and the housing body portion, and
at least a part of the accommodating recess overlaps the coupling part as viewed from the axial direction.

(3)
The intermediate tube portion is inclined radially inward toward another side in the axial direction.

(4)
The radial protrusion amount of the accommodating recess is ½ or less of a radial size of the coupling part.

(5)
A circumferential width of the accommodating recess is equal to or less than a circumferential width of the coupling part.

(6)
The coupling part is formed to be inclined to one side in the circumferential direction from a radially inner end toward a radially outside.

(7)
The coupling part includes
a coupling recess that is disposed to oppose the stator accommodating portion in the axial direction and is recessed on one side in the axial direction from an end surface on another side in the axial direction.

(8)
The stator accommodating portion further includes
an accommodating lid portion that covers the stator from another side in the axial direction and expands in a radial direction, and
an accommodating inclined portion that couples the first tube portion and the accommodating lid portion and is inclined radially inward toward the other side in the axial direction.

FIGS. 1 and 2 are a perspective view and an exploded perspective view, respectively, of an example of the blower 1 according to the first example embodiment of the present disclosure. The blower 1 includes a motor 20, an impeller 30, and a housing 40.

The impeller 30 is fixed to the motor 20 and rotates about the rotation axis J to generate an airflow on the lower side Z1 in the axial direction (the other side in the axial direction) along the rotation axis J.

The housing 40 is formed in a tubular shape extending along the rotation axis J, and has a blowing flow path 41 in which both end surfaces in the axial direction are opened and an airflow internally circulates. The motor 20 and the impeller 30 are accommodated inside the housing 40. The housing 40 has an exhaust port 42 on a lower end surface (the other end surface in the axial direction) (see FIG. 3) and an intake port 43 on an upper end side (one end surface in the axial direction).

The housing 40 is configured by axially coupling an upper housing part 40a and a lower housing part 40b. The upper housing part 40a and the lower housing part 40b are resin molded articles. In the present example embodiment, the housing 40 can be divided into the upper housing part 40a and the lower housing part 40b, but the upper housing part 40a and the lower housing part 40b may be integrally formed. The upper housing part 40a includes an upper body portion 401a, a fixing part 402a, and coupling parts 403a and 403b. The upper body portion 401a extends in the axial direction and is formed in a tubular shape.

The fixing part 402a and the coupling parts 403a and 403b constitute a lid portion 27 that covers an opening 25a (see FIG. 4) of a stator accommodating portion 25 described below. The lid portion 27 is a part of the housing 40 and also a part of the motor 20. The fixing part 402a is arranged on an upper side Z2 in the axial direction (one side in the axial direction) of the stator accommodating portion 25 described below, and has a disk shape expanding in the radial direction about the rotation axis J. A stator 23 described below of the motor 20 is fixed to the fixing part 402a. That is, the fixing part 402a is formed in a plate shape to which the stator 23 is fixed.

The coupling parts 403a and 403b extend radially outward from the fixing part 402a and couple the fixing part 402a and a housing body portion 40c. A plurality of the coupling parts 403a are arranged in the circumferential direction and axially opposes an accommodating recess 252a described below. The coupling part 403b is disposed at one position in the circumferential direction and axially opposes a pullout piece 2522 described below. The air circulating through the blowing flow path 41 passes through between the adjacent coupling parts 403a and 403b.

The coupling part 403a is formed to be inclined to one side in the circumferential direction from the radially inner end toward the radially outside. Due to this, the airflow flowing into the housing 40 from the intake port 43 smoothly circulates along the coupling part 403a. Therefore, the blowing efficiency of the blower 1 can be further improved. The coupling part 403a may be formed to be inclined to the other side in the circumferential direction from the radially inner end toward the radially outside. The coupling part 403a may be formed to extend linearly in the radial direction. The coupling part 403b is formed to extend linearly in the radial direction.

The coupling part 403a has a coupling recess 405a (see FIG. 4). The coupling recess 405a is disposed to oppose the stator accommodating portion 25 in the axial direction, and is recessed to the one side in the axial direction from the lower end surface (end surface on the other side in the axial direction) of the coupling part 403a. This can prevent the stator accommodating portion 25 from coming into contact with the coupling part 403 when swung in the axial direction.

The lower housing part 40b has a lower body portion 401b that extends in the axial direction and is formed in a tubular shape. The lower body portion 401b and the upper body portion 401a are coupled in the axial direction to constitute the housing body portion 40c. That is, the blower 1 includes the housing body portion 40c, and the housing body portion 40c is formed in a tubular shape extending along the rotation axis J, and internally has the blowing flow path 41 with both end surfaces in the axial direction opened. The motor 20 and the impeller 30 are accommodated inside the housing body portion 40c.

The impeller 30 includes an impeller cup 31 and a plurality of blades 32. The impeller cup 31 is fixed to a radially outside of a rotor 24 described below of the motor 20. The plurality of blades 32 are arrayed in the circumferential direction on a radially outer surface of the impeller cup 31.

FIG. 3 is a longitudinal cross-sectional perspective view of the blower 1, and FIG. 4 is a longitudinal cross-sectional perspective view showing a part of the blower 1 in an enlarged manner. The motor 20 includes a shaft 21, a bearing 22, the stator 23, the rotor 24, the stator accommodating portion 25, a seal 26, the above-described lid portion 27, and a circuit board 28.

The shaft 21 extends along the rotation axis J. The shaft 21 is a columnar member that is made of metal such as stainless steel and extends in the axial direction.

The bearings 22 are arranged in a pair at least spaced apart in the axial direction. The bearing 22 is configured by, for example, a ball bearing, but may be configured by a sleeve bearing or the like. The pair of bearings 22 support the shaft 21 so as to be rotatable about the rotation axis J with respect to the stator 23.

The stator 23 opposes the rotor 24 with a gap interposed radially inward. The stator 23 includes a bearing holding portion 231, a stator core 232, an insulator 233, and a coil 234. The bearing holding portion 231 is formed in a cylindrical shape and internally holds the bearing 22.

An upper end portion (one end portion in the axial direction) of the bearing holding portion 231 is fitted via a connector 45 into a fitting hole 404a of the fixing part 402a. Due to this, the bearing holding portion 231 is fixed to the fixing part 402a, and the stator 23 and the housing 40 are fixed. The fitting hole 404a is formed to penetrate the fixing part 402a in the axial direction. The connector 45 is formed in an annular shape and is disposed on the inner peripheral surface of the fitting hole 404a. The bearing holding portion 231 is disposed on the inner peripheral surface of the connector 45. A lower end portion (the other end portion in the axial direction) of the bearing holding portion 231 is fixed to the stator accommodating portion 25 described below. The upper end portion (one end portion in the axial direction) of the bearing holding portion 231 may be directly fitted into the fitting hole 404a without the connector 45.

The stator core 232 is formed by vertically stacking electromagnetic steel plates such as silicon steel plates. The insulator 233 is made of an insulating resin. The stator core 232 includes an annular core back (not shown) and a plurality of teeth (not shown) protruding radially outward from the core back and arranged in the circumferential direction. The insulator 233 is provided on a part of the outer surface in the axial direction of the teeth and a part of the outer surface in the circumferential direction of the teeth. The insulator 233 is provided surrounding an outer surface of the stator core 232. The coil 234 is formed of a conductive wire wound around the stator core 232 via the insulator 233.

The rotor 24 rotates about the rotation axis J with respect to the stator 23. The rotor 24 includes a rotor yoke 241 and a magnet 242.

The rotor yoke 241 is a member in a substantially cylindrical shape made of a magnetic material and having a lid on the axially inside. The rotor yoke 241 is fixed to the lower end portion (the other end portion in the axial direction) of the shaft 21. The magnet 242 has a cylindrical shape and is fixed to an inner peripheral surface of the rotor yoke 241. Due to this, the magnet 242 is disposed on the radially outside of the stator 23.

The circuit board 28 is in contact with the upper end (one end in the axial direction) of the insulator 233 and is disposed between the stator core 232 and the lid portion 27. The circuit board 28 has a disk shape expanding in the radial direction about the rotation axis J, for example. The circuit board 28 has a board through hole 28a. The board through hole 28a is disposed on the rotation axis J and penetrates in the axial direction. The upper end portion (one end portion in the axial direction) of the bearing holding portion 231 is inserted into the board through hole 28a and extends in the upper side Z2 in the axial direction (one side in the axial direction) relative to the circuit board 28.

A conductive wire (not shown) constituting the coil 234 is electrically connected to the circuit board 28. An electronic circuit for supplying a drive current to the coil 234 is mounted on the circuit board 28. The circuit board 28 is connected to a lead wire 50 (see FIGS. 6 and 7), and the lead wire 50 is pulled out to the outside of the stator accommodating portion 25 and connected to an external power source. The lead wire 50 is electrically connected to the coil 234, and the lead wire 50 and the stator 23 are electrically connected. In the present example embodiment, three lead wires 50 are pulled out to the outside of the stator accommodating portion 25.

FIGS. 5 and 6 are a perspective view and a top view, respectively, of the motor 20, and FIG. 7 is a longitudinal cross-sectional perspective view of the stator accommodating portion 25. In FIGS. 5 and 6, the rotor 24, the seal 26, and the lid portion 27 are not shown, and the elastic portion 29 is indicated by a dotted line. In FIG. 5, the lead wire 50 is not shown, and in FIGS. 6 and 7, the lead wire 50 is indicated by an alternate long and short dash line.

The stator accommodating portion 25 is formed in a tubular shape and has the opening 25a on one end surface in the axial direction (end surface on one side in the axial direction). The stator accommodating portion 25 internally accommodates the shaft 21, the bearing 22, the stator 23, and the circuit board 28. The stator accommodating portion 25 is filled with the seal 26 (see FIG. 4). Due to this, the shaft 21, the bearing 22, the stator 23, and the circuit board 28 are integrated, and the assembly workability of the motor 20 is improved.

The stator core 232 is press-fitted into the inner peripheral surface of the stator accommodating portion 25. At this time, the radially outer surfaces of the teeth (not shown) come into contact with the inner peripheral surface of the stator accommodating portion 25. The outer peripheral surface of the stator accommodating portion 25 opposes the magnet 242 in the radial direction with a gap interposed (see FIG. 3).

The seal 26 is formed of a curable insulating resin or the like, and for example, an epoxy resin, silicone rubber, a polyurethane resin, or the like is used. The liquid seal 26 is filled inside the stator accommodating portion 25 from the opening 25a and is cured after a predetermined time elapses. Due to this, the stator 23 and the circuit board 28 are covered with the cured seal 26, and waterproof property, oil proof property, and the like of the stator 23 and the circuit board 28 are improved.

The stator accommodating portion 25 includes a stator tube portion 251, a board tube portion 252, an intermediate tube portion 253, an accommodating lid portion 254, and an accommodating inclined portion 255.

The stator tube portion 251 surrounds the stator 23 from the radially outside. The board tube portion 252 surrounds the circuit board 28 from radially outside. The intermediate tube portion 253 couples the stator tube portion 251 and the board tube portion 252.

The accommodating lid portion 254 covers the stator 23 from the lower side Z1 in the axial direction (the other side in the axial direction) and expands in the radial direction. The accommodating lid portion 254 has an accommodating through hole 254a and an accommodating holding portion 254b penetrating in the axial direction. The lower end portion (the other end portion in the axial direction) of the bearing holding portion 231 is fitted into the accommodating through hole 254a (see FIG. 3). Due to this, the stator accommodating portion 25 is fixed to the bearing holding portion 231. The accommodating holding portion 254b protrudes in the upper side Z2 in the axial direction (one side in the axial direction) from the peripheral edge of the accommodating through hole 254a, and is formed in a tubular shape. The accommodating holding portion 254b holds the lower end portion (the other end portion in the axial direction) of the bearing holding portion 231.

The board tube portion 252 has the accommodating recess 252a. The accommodating recess 252a is arranged in the upper end portion (one end portion in the axial direction) of the stator accommodating portion 25 and is recessed radially outward from the radially inner surface. In the radial direction, a gap S is formed between the radially outer edge of the circuit board 28 and the accommodating recess 252a. In the present example embodiment, the accommodating recess 252a has a part of the board tube portion 252 formed in a convex shape radially outside, and is provided at three places at equal intervals in the circumferential direction. The number of accommodating recesses 252a is not limited to three. By providing the accommodating recess 252a, the seal 26 can smoothly flow into the stator accommodating portion 25 from the gap S. This improves the assembling workability of the blower 1.

As viewed from the axial direction, at least a part of the accommodating recess 252a overlaps the coupling part 403a of the lid portion 27 (see FIG. 4). In the present example embodiment, the circumferential width of the accommodating recess 252a is equal to or less than the circumferential width of the coupling part 403a, and the entire accommodating recess 252a overlaps the coupling part 403a as viewed from the axial direction. This can reduce the airflow that passes through between the adjacent coupling parts 403a and flows into the housing 40 from being disturbed in the vicinity of the accommodating recess 252a. Therefore, the blowing efficiency of the blower 1 can be improved.

The radial protrusion amount of the accommodating recess 252a is ½ or less of the radial size of the coupling part 403a. This can further reduce the airflow that passes through between the adjacent coupling parts 403a and flows into the housing 40 from being disturbed in the vicinity of the accommodating recess 252a. It is preferable that the radial protrusion amount of the accommodating recess 252a is smaller as long as a predetermined size of the gap S is secured.

The intermediate tube portion 253 is inclined radially inward toward the lower side Z1 in the axial direction (the other side in the axial direction). This allows the seal 26 to smoothly flow into the stator tube portion 251 from the board tube portion 252 along the intermediate tube portion 253. The resin amount of the seal 26 can be reduced, and the manufacturing cost can be reduced.

The accommodating inclined portion 255 couples the stator tube portion 251 and the accommodating lid portion 254 and is inclined radially inward toward the lower side Z1 in the axial direction (the other side in the axial direction). This allows the seal 26 to smoothly flow into the radially inside of the accommodating lid portion 254 from the stator tube portion 251 along the accommodating inclined portion 255.

The stator accommodating portion 25 has an accommodating projection 251a that protrudes from the radially inner surface and extends in the axial direction (see FIG. 7). In the present example embodiment, the accommodating projection 251a is disposed on the radially inner surface of the stator tube portion 251. The accommodating projection 251a is fitted into a groove (not shown) formed on the radially outer surface of the stator core 232 and extending in the axial direction. This enables easy positioning in the circumferential direction of the stator core 232 in the stator accommodating portion 25. In a state where the stator core 232 is accommodated in the stator accommodating portion 25, the accommodating projection 251a is press-fitted between teeth (not shown) adjacent in the circumferential direction.

The stator accommodating portion 25 further includes a cutout 2521 and the pullout piece 2522.

The cutout 2521 is recessed from the upper end (one end in the axial direction) of the stator accommodating portion 25 to the lower side Z1 in the axial direction (the other side in the axial direction), and the lead wire 50 is pulled out radially outward (see FIG. 7).

The pullout piece 2522 protrudes radially outward from the bottom of the cutout 2521, and is formed in a plate shape. The elastic portion 29 in a rectangular parallelepiped shape is disposed on the upper surface (end surface on one side in the axial direction) of the pullout piece 2522. The lead wire 50 is disposed on the upper surface (end surface on one side in the axial direction) of the elastic portion 29. The upper end (one end in the axial direction) of the elastic portion 29 is disposed on the upper side Z2 in the axial direction (one side in the axial direction) relative to the upper end (one end in the axial direction) of the board tube portion 252.

Due to this, even when flowing out to the outside of the cutout 2521, the seal 26 before being cured is dammed by the elastic portion 29. Therefore, the seal 26 before being cured can be prevented from flowing out of the stator accommodating portion 25 via the cutout 2521. At this time, the upper end (one end in the axial direction) of the elastic portion 29 is disposed on the upper side Z2 in the axial direction (one side in the axial direction) relative to the upper end (one end in the axial direction) of the cured seal 26.

The elastic portion 29 is fixed to the pullout piece 2522 via an adhesive layer 29a (see FIG. 7). This allows the elastic portion 29 to be easily fixed to the pullout piece 2522, and improves the assembling workability of the motor 20. The elastic portion 29 is made of, for example, a rubber portion.

By providing the pullout piece 2522, the lead wire 50 can be pulled out radially outward while being supported by the pullout piece 2522 without being largely bent in the axial direction. Therefore, damage to the lead wire 50 can be prevented.

The pullout piece 2522 includes a pullout inclined portion 2522a, a pullout projection 2522b, and a pair of pullout wall portions 2522c. The pullout inclined portion 2522a is inclined in the upper side Z2 in the axial direction (one side in the axial direction) toward radially outward from the bottom of the cutout 2521. By providing the pullout inclined portion 2522a, the seal 26 before being cured can be further prevented from flowing out to the outside of the stator accommodating portion 25 via the cutout 2521.

The pullout projection 2522b is disposed adjacent to the radially outside of the cutout 2521 and protrudes from the upper surface (end surface on one side in the axial direction) of the pullout piece 2522. By providing the pullout projection 2522b, the elastic portion 29 can be easily positioned.

The pullout wall portion 2522c protrudes in the upper side Z2 in the axial direction (one side in the axial direction) from both end portions in the radial direction of the pullout piece 2522 and extends in the radial direction. The radially inner end of the pullout wall portion 2522c is coupled to the outer peripheral surface of the board tube portion 252. The upper end (one end in the axial direction) of the pullout wall portion 2522c is disposed in the upper side Z2 in the axial direction (one side in the axial direction) relative to the upper end (one end in the axial direction) of the board tube portion 252. Due to this, the seal 26 before being cured can be further prevented from flowing out to the outside of the stator accommodating portion 25 via the cutout 2521.

The pullout piece 2522 is arranged to oppose the coupling part 403b (lid portion 27) in the axial direction. At this time, the lead wire 50 is sandwiched between the coupling part 403b (lid portion 27) and the pullout piece 2522 via the elastic portion 29. At this time, the elastic portion 29 deforms along the outer peripheral surface of the lead wire 50, and a minute gap is hardly generated between the lead wire 50 and the elastic portion 29. This can prevent the seal 26 before being cured from passing through between the lead wire 50 and the elastic portion 29 due to a capillary phenomenon along the lead wire 50. Therefore, the seal 26 can be prevented from flowing out to the outside of the stator accommodating portion 25. This can provide the motor 20 that can prevent the seal 26 from flowing out.

FIG. 8 is a longitudinal cross-sectional view schematically showing a part of the motor 20. The upper end (one end in the axial direction) of the stator accommodating portion 25 is positioned in the lower side Z1 in the axial direction (the other side in the axial direction) relative to the lower end (the other end in the axial direction) of the lid portion 27 on the radially inside relative to the upper end (one end in the axial direction) of the stator accommodating portion 25.

There is a possibility that the seal 26 bulges and is cured in the upper side Z2 in the axial direction (one side in the axial direction) along the radially inner surface of the stator accommodating portion 25, and a fillet is formed at the radially outer end portion of the seal 26. The fillet does not bulge in the upper side Z2 of the axial direction (one side in the axial direction) beyond the upper end (one end in the axial direction) of the stator accommodating portion 25. Due to this, even when a fillet is formed along the radially inner surface of the stator accommodating portion 25, the upper end (one end in the axial direction) of the fillet is positioned in the lower side Z1 in the axial direction (the other side in the axial direction) relative to the lower end (the other end in the axial direction) of the lid portion 27. Therefore, the lid portion 27 covering the opening 25a and the seal 26 can be prevented from coming into contact with each other. This can downsize the motor 20 in the axial direction.

In the present example embodiment, the seal 26 is filled up to the upper end (one end in the axial direction) of the stator accommodating portion 25, and the upper end (one end in the axial direction) of the cured seal 26 is disposed at the same height in the axial direction as the upper side Z2 in the axial direction (one side in the axial direction) relative to the upper end (one end in the axial direction) of the stator accommodating portion 25 or the one end in the axial direction of the stator accommodating portion 25. At this time, at the radially outer end portion of the seal 26, a fillet is not formed along the radially inner surface of the stator accommodating portion 25. Therefore, it is possible to reduce variation, for each product, in the height of the upper end (end surface on one side in the axial direction) of the seal 26. This allows the lid portion 27 to be disposed close to the upper end (one end in the axial direction) of the stator accommodating portion 25 while preventing the lid portion 27 and the seal 26 from coming into contact with each other. Therefore, it is possible to further downsize the motor 20 in the axial direction.

The upper end surface (end surface on one side in the axial direction) of the seal 26 is formed orthogonal to the axial direction. This allows the lid portion 27 to be disposed closer to the upper end (one end in the axial direction) of the stator accommodating portion 25.

When the upper end (one end in the axial direction) of the cured seal 26 is disposed in the lower side Z1 in the axial direction (the other side in the axial direction) relative to the upper end (one end in the axial direction) of the stator accommodating portion 25, the upper end (one end in the axial direction) of the stator accommodating portion 25 can be disposed close to the lid portion 27. At this time, the coupling recess 405a is formed in the lower end surface (the end surface on the other side in the axial direction) of the coupling part 403a, and it is possible to prevent the upper end (one end in the axial direction) of the stator accommodating portion 25 and the lid portion 27 from coming into contact with each other.

The upper end (one end in the axial direction) of the bearing holding portion 231 extends to the upper side Z2 in the axial direction (one side in the axial direction) relative to the upper end (one end in the axial direction) of the stator accommodating portion 25 and is fixed to the lid portion 27. This allows the lid portion 27 and the stator accommodating portion 25 to be easily fixed with a small number of components via the bearing holding portion 231 in a state where the lid portion 27 and the upper end portion of the stator accommodating portion 25 filled with the seal 26 are not in contact with each other.

The bearing holding portion 231 has a holding protrusion 2311. The holding protrusion 2311 is disposed the upper side Z2 in the axial direction (one side in the axial direction) relative to the upper end (one end in the axial direction) of the circuit board 28. The holding protrusion 2311 protrudes radially outward from the radially outer surface and is formed in an annular shape. The lower end (the other end in the axial direction) of the holding protrusion 2311 is positioned at substantially the same height as the upper end (one end in the axial direction) of the stator accommodating portion 25 in the axial direction. The holding protrusion 2311 may be integrated with or separated from the bearing holding portion 231. When the holding protrusion 2311 is separated from the bearing holding portion 231, the holding protrusion 2311 is attached to the bearing holding portion 231 after the circuit board 28 is disposed on the upper end (one end in the axial direction) of the insulator 233. This improves assembly workability of the circuit board 28.

When the seal 26 is about to be cured bulging to the upper side Z2 in the axial direction (one side in the axial direction) along the radially outer surface of the bearing holding portion 231, the holding protrusion 2311 can suppress rise of the seal 26. This can prevent the lid portion 27 covering the opening 25a and the seal 26 from coming into contact with each other. By arranging the lower end (the other end in the axial direction) of the holding protrusion 2311 at substantially the same height as the upper end (one end in the axial direction) of the stator accommodating portion 25 in the axial direction, the upper end surface (the end surface on one side in the axial direction) of the seal 26 orthogonal to the axial direction can be easily formed when the seal 26 is filled up to the upper end (one end in the axial direction) of the stator accommodating portion 25.

The radially outer end of the holding protrusion 2311 is positioned radially outside relative to the peripheral edge of the board through hole 28a. Due to this, the holding protrusion 2311 further protrudes radially outward, and the rise of the seal 26 can be more reliably suppressed.

The holding protrusion 2311 has a curved surface 2312. The curved surface 2312 is disposed at the other end portion in the axial direction of the holding protrusion 2311, is inclined to the upper side Z2 in the axial direction (one side in the axial direction) toward the radially outside, and is curved convexly toward the radially outside. This allows the holding protrusion 2311 to more reliably suppress the rise of the seal 26.

A plurality of grooves 2311a are formed on the radially outer surface of the holding protrusion 2311. Forming the groove 2311a makes it difficult to form a fillet along the radially outer surface of the holding protrusion 2311 when the seal 26 is cured. Therefore, the holding protrusion 2311 can suppress rise of the seal 26 more reliably. The groove 2311a is formed by knurling, for example.

Next, the second example embodiment of the present disclosure will be described. FIG. 9 is a longitudinal cross-sectional view schematically showing a part of the motor 20. For the sake of convenience in description, the same reference numerals are given to the same parts as those of the first example embodiment shown in FIGS. 1 to 8. The second example embodiment is different from the first example embodiment in that an oil repellent layer 2313 is formed on a radially outer surface of the bearing holding portion 231 in place of the holding protrusion 2311. Other parts are the same as those in the first example embodiment.

The oil repellent layer 2313 is disposed in the upper side Z2 in the axial direction (one side in the axial direction) relative to the upper end (one end in the axial direction) of the circuit board 28. The oil repellent layer 2313 includes, for example, a fluororesin, and repels the seal 26.

Due to this, the seal 26 is repelled by the oil repellent layer 2313 when the seal 26 is about to be cured bulging to the upper side in the axial direction (one side in the axial direction) along the radially outer surface of the bearing holding portion 231. Therefore, the oil repellent layer 2313 can suppress rise of the seal 26. This can prevent the lid portion 27 covering the opening 25a and the seal 26 from coming into contact with each other.

The lower end (the other end in the axial direction) of the oil repellent layer 2313 is positioned at substantially the same height as the upper end (one end in the axial direction) of the stator accommodating portion 25 in the axial direction. Due to this, the upper end surface (the end surface on one side in the axial direction) of the seal 26 orthogonal to the axial direction can be easily formed when the seal 26 is filled up to the upper end (one end in the axial direction) of the stator accommodating portion 25. While the oil repellent layer 2313 is formed on the radially outer surface of the bearing holding portion 231 in the present example embodiment, the oil repellent layer 2313 may be formed on the radially outer surface of the holding protrusion 2311 of the first example embodiment.

Next, the third example embodiment of the present disclosure will be described. FIG. 10 is a longitudinal cross-sectional view schematically showing a part of the motor 20. For the sake of convenience in description, the same reference numerals are given to the same parts as those of the first example embodiment shown in FIGS. 1 to 8. The third example embodiment is different from the first example embodiment in the position of the holding protrusion 2311. Other parts are the same as those in the first example embodiment.

The upper end (one end in the axial direction) of the holding protrusion 2311 is positioned at substantially the same height as one end in the axial direction of the stator accommodating portion 25 in the axial direction. When the seal 26 is filled up to the upper end (one end in the axial direction) of the stator accommodating portion 25, the seal 26 is hardly cured bulging to the upper side Z2 in the axial direction (one side in the axial direction) along the radially outer surface of the bearing holding portion 231 from the upper end of the holding protrusion 2311. Therefore, at the radially inner end portion of the seal 26, a fillet is not formed along the radially outer surface of the bearing holding portion 231 beyond the holding protrusion 2311. Therefore, it is possible to reduce variation, for each product, in the height of the upper end (end surface on one side in the axial direction) of the seal 26.

The holding protrusion 2311 may be integrated with or separated from the bearing holding portion 231. When the holding protrusion 2311 is separated from the bearing holding portion 231, the holding protrusion 2311 is attached to the bearing holding portion 231 after the circuit board 28 is disposed on the upper end (one end in the axial direction) of the insulator 233. This improves assembly workability of the circuit board 28.

The example embodiments of the present disclosure have been described above. The scope of the present disclosure is not limited to the above-described example embodiments. The present disclosure can be implemented with various modifications within a scope not departing from the gist of the disclosure. The above-described example embodiments can be appropriately and optionally combined. For example, the oil repellent layer 2313 may be formed on the radially outer surface of the bearing holding portion 231 in which the groove 2311a is formed.

The present disclosure can be used in, for example, a cooling device including a blower.

Features of the above-described example embodiments and the modifications thereof may be combined appropriately as long as no conflict arises.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A motor comprising:
   a rotor that is rotatable about a rotation axis;
   a stator that opposes the rotor with a gap interposed radially inward;
   a stator accommodating portion in a tubular shape that accommodates the stator and includes an opening on one end surface in an axial direction;
   a seal filled in the stator accommodating portion; and
   a lid above the stator that covers the opening; wherein
   the stator accommodating portion includes:
      a cutout recessed from one end in the axial direction to another side in the axial direction and from which a lead wire electrically connected to the stator is pulled out to a radially outer position; and
      a pullout piece that protrudes radially outward from a bottom of the cutout and on which the lead wire is provided;
   the pullout piece includes a pullout inclined portion;
   the pullout inclined portion is inclined in the one end in the axial direction and extends radially outward from the bottom of the cutout;
   the lead wire is positioned between the lid and the pullout piece via an elastic portion located on an end surface on one side in the axial direction of the pullout piece; and
   an upper end of the elastic portion in the axial direction is located above an upper end of the seal in the axial direction, the lead wire is provided directly on the upper end of the elastic portion.

2. The motor according to claim 1, wherein the pullout piece includes a pullout projection protruding from the end surface on the one side in the axial direction.

3. The motor according to claim 1, wherein the pullout piece includes a pullout wall portion that protrudes in the one side in the axial direction from both end portions in a radial direction and extends in the radial direction.

4. The motor according to claim 1, wherein
   the stator accommodating portion includes:
      a stator tube that surrounds the stator from radially outside;
      an accommodating lid that covers the stator from another side in the axial direction and expands in the radial direction; and
      an accommodating inclined portion that couples the stator tube and the accommodating lid and is inclined radially inward toward the other side in the axial direction.

5. The motor according to claim 1, wherein the stator accommodating portion includes an accommodating projection protruding from a radially inner surface and extending in the axial direction.

6. The motor according to claim 1, wherein the elastic portion is fixed to the pullout piece via an adhesive layer.

7. The motor according to claim 1, wherein the elastic portion includes a rubber portion.

8. A blower comprising:
   the motor according to claim 1;
   an impeller that is fixed to the rotor to generate an airflow in the axial direction; and
   a housing body that extends along the rotation axis, has a tubular shape, includes end surfaces in the axial direction opened, and internally includes a blowing flow path; wherein
   the motor and the impeller are accommodated inside the housing body.

9. The motor according to claim 1, wherein at least a portion of the seal is provided directly on an axially upper surface of the pullout inclined portion.

* * * * *